United States Patent
Mi et al.

(10) Patent No.: US 6,909,473 B2
(45) Date of Patent: Jun. 21, 2005

(54) DISPLAY APPARATUS AND METHOD

(75) Inventors: Xiang-Dong Mi, Rochester, NY (US); Andrew F. Kurtz, Rochester, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 230 days.

(21) Appl. No.: 10/040,663

(22) Filed: Jan. 7, 2002

(65) Prior Publication Data

US 2003/0128320 A1 Jul. 10, 2003

(51) Int. Cl.$^7$ .................. G02F 1/1335; G03B 21/14
(52) U.S. Cl. .................. 349/5; 349/9; 349/96; 349/113; 349/117; 353/20
(58) Field of Search .................. 349/5, 9, 96, 113, 349/117, 118; 353/8, 20; 359/486

(56) References Cited

U.S. PATENT DOCUMENTS

| | | | |
|---|---|---|---|
| 2,403,731 A | 7/1946 | MacNeille | 359/488 |
| 4,441,791 A | 4/1984 | Hornbeck | 359/295 |
| 4,701,028 A | 10/1987 | Clerc et al. | 349/98 |
| 5,039,185 A | 8/1991 | Uchida et al. | 349/119 |
| 5,298,199 A | 3/1994 | Hirose et al. | 349/117 |
| 5,383,053 A | 1/1995 | Hegg et al. | 359/486 |
| 5,535,047 A | 7/1996 | Hornbeck | 359/295 |
| 5,576,854 A | 11/1996 | Schmidt et al. | 349/5 |
| 5,600,383 A | 2/1997 | Hornbeck | 348/771 |
| 5,619,352 A | 4/1997 | Koch et al. | 349/89 |
| 5,620,755 A | 4/1997 | Smith, Jr. et al. | 427/344 |
| 5,652,667 A | 7/1997 | Kurogane | 349/42 |
| 5,719,695 A | 2/1998 | Heimbuch | 359/291 |
| 5,748,368 A | 5/1998 | Tamada et al. | 359/486 |
| 5,767,827 A | 6/1998 | Kobaysashi et al. | 349/113 |
| 5,798,819 A | 8/1998 | Hattori et al. | 349/9 |
| 5,808,795 A | 9/1998 | Shimomura et al. | 359/488 |

(Continued)

OTHER PUBLICATIONS

J. Chen, K. H. Kim, J. J. Jyu, and J. H. Souk; Optimum Film Compensation Modes for TN and VA LCDs; SID 98 Digest, pp. 315–318.

P. Yeh; Generalized Model for Wire Grid Polarizers; SPIE vol. 307, 1981, pp. 13–21.

H. Kikuta, H. Yoshida, and K. Iwata; Ability and Limitation of Effective Medium Theory for Subwavelength Gratings; Optical Review, vol. 2, No. 2, (1995), pp. 92–99.

J. J. Kuta, H. M. van Driel, D. Landheer, and Y. Feng; Coupled–Wave Analysis of Lamellar Metal Transmission Gratings for the Visible and the Infrared; Optical Society of America, vol. 12, No. 5, (May 1995), pp. 1118–1127.

P. Lazarev and M. Paukshto; Low–Leakage Off–Angle in E–Polarizers; SID 2001 Digest, pp. 101–105.

T. Ishinabe, T. Miyashita, and T. Uchida; Novel Wide Viewing ANgle Polarizer with High Achromaticity; SID 00 Digest, pp. 1094–1097.

*Primary Examiner*—Tarifur R. Chowdhury
(74) *Attorney, Agent, or Firm*—Nelson Adrian Blish

(57) ABSTRACT

A projection display apparatus (10) uses a modulation optical system (200) that includes a liquid crystal device (210) in combination with a wire grid polarization beamsplitter (240), a wire grid polarization analyzer (270) and a projection lens (285) to form an image. In order to achieve high contrast and maintain high brightness levels, a compensator (260) is provided for minimizing leakage light for pixels in the black (OFF) state. A number of configurations are possible, such as with the compensator (260) disposed in the optical path between the liquid crystal device (210) and the wire grid polarization beamsplitter (240) and with a secondary compensator (265) disposed between wire grid polarization analyzer (270) and the wire grid polarization beamsplitter (240).

82 Claims, 16 Drawing Sheets

U.S. PATENT DOCUMENTS

| | | | |
|---|---|---|---|
| 5,844,722 A | 12/1998 | Stephens et al. | 359/637 |
| 5,912,762 A | 6/1999 | Li et al. | 359/352 |
| 5,914,818 A | 6/1999 | Tejada et al. | 359/663 |
| 5,918,961 A | 7/1999 | Ueda | 353/20 |
| 5,930,050 A | 7/1999 | Dewald | 359/670 |
| 5,969,861 A | 10/1999 | Ueda et al. | 359/488 |
| 5,978,056 A | 11/1999 | Shintani et al. | 349/137 |
| 6,008,951 A | 12/1999 | Anderson | 359/677 |
| 6,010,121 A | 1/2000 | Lee | 269/94 |
| 6,062,694 A | 5/2000 | Oikawa et al. | 353/31 |
| 6,081,312 A | 6/2000 | Aminaka et al. | 349/118 |
| 6,089,717 A | 7/2000 | Iwai | 353/31 |
| 6,122,103 A | 9/2000 | Perkins et al. | 359/486 |
| 6,141,075 A | 10/2000 | Ohmuro et al. | 349/130 |
| 6,234,634 B1 | 5/2001 | Hansen et al. | 353/20 |
| 6,243,199 B1 * | 6/2001 | Hansen et al. | 359/486 |
| 6,288,840 B1 | 9/2001 | Perkins et al. | 359/486 |
| 6,447,120 B1 | 9/2002 | Hansen et al. | 353/20 |
| 6,486,997 B1 | 11/2002 | Bruzzone et al. | 359/247 |
| 6,511,183 B2 | 1/2003 | Shimizu et al. | 353/20 |
| 6,532,111 B2 * | 3/2003 | Kurtz et al. | 359/486 |
| 6,547,396 B1 * | 4/2003 | Svardal et al. | 353/8 |
| 6,585,378 B2 | 7/2003 | Kurtz et al. | 353/31 |
| 6,661,475 B1 | 12/2003 | Stahl et al. | 349/9 |
| 6,669,343 B2 | 12/2003 | Shahzad et al. | 353/20 |
| 2003/0072079 A1 * | 4/2003 | Silverstein et al. | 359/486 |
| 2003/0081179 A1 | 5/2003 | Pentico et al. | 353/20 |
| 2003/0161029 A1 * | 8/2003 | Kurtz et al. | 359/290 |
| 2003/0202157 A1 * | 10/2003 | Pentico et al. | 353/20 |

* cited by examiner

DISPLAY APPARATUS AND METHOD

CROSS REFERENCE TO RELATED APPLICATIONS

Reference is made to commonly-assigned copending U.S. patent application Ser. No. 09/813,207, filed Mar. 20, 2001, entitled DIGITAL CINEMA PROJECTOR, by Kurtz et al., the disclosure of which is incorporated herein.

FIELD OF THE INVENTION

This invention generally relates to digital projection apparatus employing liquid crystal devices for image forming and more particularly to an apparatus and method for achieving high levels of contrast by using a wire grid polarization beamsplitter with a compensator for minimizing leakage light in the pixel black (OFF) state.

BACKGROUND OF THE INVENTION

In order to be considered as suitable replacements for conventional film projectors, digital projection systems must meet demanding requirements for image quality. This is particularly true for cinematic projection systems. To provide a competitive alternative to conventional cinematic-quality projectors, digital projection apparatus, provide high resolution, wide color gamut, high brightness (>10,000 screen lumens), and frame-sequential system contrast ratios exceeding 1,000:1.

The most promising solutions for digital cinema projection employ one of two types of spatial light modulators as image forming devices. The first type of spatial light modulator is the digital micromirror device (DMD), developed by Texas Instruments, Inc., Dallas, Tex. DMD devices are described in a number of patents, for example U.S. Pat. Nos. 4,441,791; 5,535,047; 5,600,383 (all to Hornbeck); and U.S. Pat. No. 5,719,695 (Heimbuch). Optical designs for projection apparatus employing DMDs are disclosed in U.S. Pat. Nos. 5,914,818 (Tejada et al.); 5,930,050 (Dewald); 6,008,951 (Anderson); and 6,089,717 (Iwai). Although DMD-based projectors demonstrate some capability to provide the necessary light throughput, contrast ratio, and color gamut, current resolution limitations (1024×768 pixels) and high component and system costs have restricted DMD acceptability for high-quality digital cinema projection.

The second type of spatial light modulator used for digital projection is the liquid crystal device (LCD). The LCD forms an image as an array of pixels by selectively modulating the polarization state of incident light for each corresponding pixel. At high resolution, large area LCDs can be fabricated more readily than DMDs. LCDs are a viable alternative modulator technology to be used in digital cinema projection systems. Among examples of electronic projection apparatus that utilize LCD spatial light modulators are those disclosed in U.S. Pat. Nos. 5,808,795 (Shimomura et al.); 5,798,819 (Hattori et al.); 5,918,961 (Ueda); 6,010,121 (Maki et al.); and 6,062,694 (Oikawa et al.). Recently, JVC demonstrated an LCD-based projector capable of high-resolution (providing 2,000×1280 pixels), high frame sequential contrast (in excess of 1000:1), and high light throughput (nominally, up to 12,000 lumens). This system utilized three vertically aligned (VA) (also referred as homeotropic) LCDs (one per color) driven or addressed by cathode ray tubes (CRTs). While this system demonstrated the potential for an LCD based digital cinema projector, system complexity and overall reliability remain concerns. In addition, cost considerations render such a system not yet ready for broad commercialization in the digital cinema projection market.

JVC has also developed a new family of vertically aligned LCDs, which are directly addressed via a silicon backplane (LCOS), rather than indirectly by a CRT. While these new devices are promising, they have not yet been demonstrated to fully meet the expectations for digital cinema presentation. The JVC LCD devices are described, in part, in U.S. Pat. Nos. 5,652,667 (Kuragane); 5,767,827 (Kobayashi et aL); and 5,978,056 (Shintani et al.) In contrast to early twisted nematic or cholesteric LCDs, vertically aligned LCDs promise to provide much higher modulation contrast ratios (in excess of 2,000:1). U.S. Pat. No. 5,620,755 (Smith et al.), also assigned to JVC, specifically describes a methodology for inducing vertical alignment in LC displays. It is instructive to note that, in order to obtain on screen frame sequential contrast of 1,000:1 or better, the entire system must produce >1000:1 contrast, and both the LCDs and any necessary polarization optics must each separately provide ~2,000:1 contrast. Notably, while polarization compensated vertically aligned LCDs can provide contrast >20,000:1 when modulating collimated laser beams, these same modulators may exhibit contrasts of 500:1 or less when modulating collimated laser beams without the appropriate polarization compensation. Modulation contrast is also dependent on the spectral bandwidth and angular width (F#) of the incident light, with contrast generally dropping as the bandwidth is increased or the F#is decreased. Modulation contrast within LCDs can also be reduced by residual de-polarization or mis-orienting polarization effects, such as thermally induce stress birefringence. Such effects can be observed in the far field of the device, where the typically observed "iron cross" polarization contrast pattern takes on a degenerate pattern.

As is obvious to those skilled in the digital projection art, the optical performance provided by LCD based electronic projection system is, in large part, defined by the characteristics of the LCDs themselves and by the polarization optics that support LCD projection. The performance of polarization separation optics, such as polarization beamsplitters, pre-polarizers, and polarizer/analyzer components is of particular importance for obtaining high contrast ratios. The precise manner in which these polarization optical components are combined within a modulation optical system of a projection display can also have significant impact on the final resultant contrast.

The most common conventional polarization beamsplitter solution, which is used in many projection systems, is the traditional MacNeille prism, disclosed in U.S. Pat. No. 2,403,731. This device has been shown to provide a good extinction ratio (on the order of 300:1). However, this standard prism operates well only with incident light over a limited range of angles (a few degrees). Because the MacNeille prism design provides good extinction ratio for one polarization state only, a design using this device must effectively discard half of the incoming light when this light is from an unpolarized white light source, such as from a xenon or metal halide arc lamp.

Conventional glass polarization beamsplitter design, based on the MacNeille design, has other limitations beyond the limited angular response, which could impede its use for digital cinema projection. In particular, bonding techniques used in fabrication or thermal stress in operation, can cause stress birefringence, in turn degrading the polarization contrast performance of the beamsplitter. These effects, which are often unacceptable for mid range electronic projection applications, are not tolerable for cinema projection applications. The thermal stress problem has recently been improved upon, with the use of a more suitable low photo-elasticity optical glass, disclosed in U.S. Pat. No. 5,969,861 (Ueda et al.), which was specially designed for use in polarization components. Unfortunately, high fabrication costs and uncertain availability limit the utility of this solution. Furthermore, while it would be feasible to custom melt low-stress glass prisms suited to each wavelength band in order to minimize stress birefringence, while somewhat expanding angular performance, such a solution is costly and error-prone. As a result of these problems, the conventional MacNeille based glass beamsplitter design, which is capable of the necessary performance for low to mid-range electronic projection systems, operating at 500–5,000 lumens with approximately 800:1 contrast, likely falls short of the more demanding requirements of full-scale commercial digital cinema projection.

Other polarization beamsplitter technologies have been proposed to meet the needs of an LCD based digital cinema projection system. For example, the beamsplitter disclosed in U.S. Pat. No. 5,912,762 (Li et al.), which comprises a plurality of thin film layers sandwiched between two dove prisms, attempts to achieve high extinction ratios for both polarization states. Theoretically, this beamsplitter device is capable of extinction ratios in excess of 2,000:1. Moreover, when designed into a projection system with six LCDs (two per color), this prism could boost system light efficiency by allowing use of both polarizations. However, size constraints and extremely tight coating tolerances present significant obstacles to commercialization of a projection apparatus using this beamsplitter design.

As another conventional solution, some projector designs have employed liquid-immersion polarization beamsplitters. Liquid-filled beamsplitters (see U.S. Pat. No. 5,844,722 (Stephens), for example) have been shown to provide high extinction ratios needed for high-contrast applications and have some advantages under high-intensity light conditions. However, these devices are costly to manufacture, must be fabricated without dust or contained bubbles and, under conditions of steady use, have exhibited a number of inherent disadvantages. Among the disadvantages of liquid-immersion polarization beamsplitters are variations in refractive index of the liquid due to temperature, including uneven index distribution due to convection. Leakage risk presents another potential disadvantage for these devices.

Wire grid polarizers have been in existence for many years, and were primarily used in radio-frequency and far infrared optical applications. Use of wire grid polarizers with visible spectrum light has been limited, largely due to constraints of device performance or manufacture. For example, U.S. Pat. No. 5,383,053 (Hegg et al.) discloses use of a wire grid beamsplitter in a virtual image display apparatus. In the Hegg et al. disclosure, an inexpensive wire grid beamsplitter provides high light throughput efficiency when compared against conventional prism beamsplitters. The polarization contrast provided by the wire grid polarizer of Hegg et al. is very low (6.3:1) and unsuitable for digital projection. A second wire grid polarizer for the visible spectrum is disclosed in U.S. Pat. No. 5,748,368 (Tamada). While the device discussed in this patent provides polarization separation, the contrast ratio is inadequate for cinematic projection and the design is inherently limited to rather narrow wavelength bands.

Recently, as is disclosed in U.S. Pat. Nos. 6,122,103 (Perkins et al.); 6,243,199 (Hansen et al.); and 6,288,840 (Perkins et al.), high quality wire grid polarizers and beamsplitters have been developed for broadband use in the visible spectrum. These new devices are commercially available from Moxtek Inc. of Orem, Utah. While existing wire grid polarizers, including the devices described in U.S. Pat. Nos. 6,122,103 and 6,243,199 may not exhibit all of the necessary performance characteristics needed for obtaining the high contrast required for digital cinema projection, these devices do have a number of advantages. When compared against standard polarizers, wire grid polarization devices exhibit relatively high extinction ratios and high efficiency. Additionally, the contrast performance of these wire grid devices also has broader angular acceptance (NA or numerical aperture) and more robust thermal performance with less opportunity for thermally induced stress birefringence than standard polarization devices. Furthermore, the wire grid polarizers are robust relative to harsh environmental conditions, such as light intensity, temperature, and vibration. These devices perform well under conditions of different color channels, with the exception that response within the blue light channel may require additional compensation.

Wire grid polarization beamsplitter (PBS) devices have been employed within some digital projection apparatus. For example, U.S. Pat. No. 6,243,199 (Hansen et al.) discloses use of a broadband wire grid polarizing beamsplitter for projection display applications. U.S. Pat. No. 6,234,634 (also to Hansen et al.) discloses a wire grid polarizing beamsplitter that functions as both polarizer and analyzer in a digital image projection system. U.S. Pat. No. 6,234,634 states that very low effective F#'s can be achieved using wire grid PBS, with some loss of contrast, however. Notably, U.S. Pat. No. 6,234,634 does not discuss how polarization compensation may be used in combination with wire grid devices to reduce light leakage and boost contrast for fast optical systems operating at low F#'s.

In general, wire grid polarizers have not yet been satisfactorily proven to meet all of the demanding requirements imposed by digital cinema projection apparatus, although progress is being made. Deficiencies in substrate flatness, in overall polarization performance, and in robustness at both room ambient and high load conditions have limited commercialization of wire grid polarization devices for cinematic projection.

Of particular interest and relevance for the apparatus and methods of the present invention, it must be emphasized that individually neither the wire grid polarizer, nor the wire grid polarization beamsplitter, provide the target polarization extinction ratio performance (nominally >2,000:1) needed to achieve the desired projection system frame sequential contrast of 1,000:1 or better, particularly at small F#'s (<F/3.5). Rather, both of these components provide less than ~1,200:1 contrast under the best conditions. Significantly, performance falls off further in the blue spectrum. Therefore, to achieve the desired 2,000:1 contrast target for the optical portion of the system (excluding the LCDs), it is necessary to utilize a variety of polarization devices, including possibly wire grid polarization devices, in combination within a modulation optical system of the projection display. However, the issues of designing an optimized configuration of polarization optics, including wire grid polarizers, in combination with the LCDs, color optics, and projection lens, have not been completely addressed either for electronic projection in general, or for digital cinema projection in particular. Moreover, the prior art does not describe how to design a modulation optical system for a projection display using both LCDs and wire grid devices, which further has polarization compensators to boost contrast.

There are numerous examples of polarization compensators developed to enhance the polarization performance of LCDs generally, and vertically aligned LCDs particularly. In an optimized system, the compensators are simultaneously designed to enhance the performance of the LCDs and the polarization optics in combination. These compensators typically provide angular varying birefringence, structured in a spatially variant fashion, to affect polarization states in portions (within certain spatial and angular areas) of the transiting light beam, without affecting the polarization states in other portions of the light beam. Polarization compensators have been designed to work with LCDs generally, but also vertically aligned LCDs in particular. U.S. Pat. No. 4,701,028 (Clerc et al.) discloses birefringence compensation designed for a vertically aligned LCD with restricted thickness. U.S. Pat. No. 5,039,185 (Uchida et al.) discloses a vertically aligned LCD with compensator comprising at least two uniaxial or two biaxial retarders provided between a sheet polarizer/analyzer pair. U.S. Pat. No. 5,298, 199 (Hirose et al.) discloses the use of a biaxial film compensator correcting for optical birefringence errors in the LCD, used in a package with crossed sheet polarizers, where the LCD dark state has a non-zero voltage (a bias voltage). U.S. Pat. No. 6,081,312 (Aminaka et al.) discloses a discotic film compensator which is designed to optimize contrast for a voltage ON state of the VA LCD. By comparison, U.S. Pat. No. 6,141,075 (Ohmuro et al.) discloses a VA LCD compensated by two retardation films, one with positive birefringence and the other with negative birefringence.

U.S. Pat. No. 5,576,854 (Schmidt et al.) discloses a compensator constructed for use in projector apparatus using an LCD with the conventional MacNeille prism type polarization beamsplitter. This compensator comprises a ¼ wave plate for compensating the prism and an additional 0.02 λ's compensation for the inherent LCD residual birefringence effects. U.S. Pat. No. 5,619,352 (Koch et al.) discloses compensation devices, usable with twisted nematic LCDs, where the compensators have a multi-layer construction, using combinations of A-plates, C-plates, and O-plates, as needed.

In general, most of these prior art compensator patents assume the LCDs are used in combination with sheet polarizers, and correct for the LCD polarization errors. However, polarization compensators have also been explicitly developed to correct for non-uniform polarization effects from the conventional Polaroid type dye sheet polarizer. The dye sheet polarizer, developed by E. H. Land in 1929 functions by dichroism, or the polarization selective anisotropic absorption of light. Compensators for dye sheet polarizers are described in Chen et al. (J. Chen, K.-H. Kim, J.-J. Kyu, J. H. Souk, J. R. Kelly, P. J. Bos, "Optimum Film Compensation Modes for TN and VA LCDs", SID 98 Digest, pgs. 315–318.), and use a combination A-plate and C-plate construction. The maximum contrast of the LCD system aimed at in prior art patents such as in U.S. Pat. No. 6,141,075 (Ohmuro et al.) is only up to 500:1, which is sufficient for many applications, but does not meet the requirement of digital cinema projection.

While this prior art material extensively details the design of polarization compensators used under various conditions, compensators explicitly developed and optimized for use with wire grid polarizers are not disclosed. Furthermore, the design of polarization compensators to enhance the performance of a modulation optical system using multiple wire grid polarizer devices, or using multiple wire grid devices in combination with vertically aligned LCDs, have not been previously disclosed. Without compensation, the wire grid polarization beamsplitter provides acceptable contrast when incident light is within a low numerical aperture. However, in order to achieve high brightness levels, it is most advantageous for an optical system to have a high numerical aperture (>~0.13), so that it is able to gather incident light at larger oblique angles. The conflicting goals of maintaining high brightness and high contrast ratio present a significant design problem for polarization components. Light leakage in the OFF state must be minimal in order to achieve high contrast levels. Yet, light leakage is most pronounced for incident light at the oblique angles required for achieving high brightness.

Compensator requirements for wire grid polarizing beamsplitter devices differ significantly from more conventional use of compensators with polarizing beamsplitter devices based on the MacNeille prism design as was noted in reference to U.S. Pat. No. 5,576,854. Performance results indicate that the conventional use of a ¼ wave plate compensator is not a solution and can even degrade contrast ratio. Additionally, while compensators have previously been specifically developed to work in tandem with VA LCDs in projection display systems, compensators optimized for use with VA LCDs in the context of a modulation optical system which utilizes wire grid polarization beamsplitters have not been developed and disclosed.

Thus it can be seen that there is a need for an improved projection apparatus that uses wire grid polarization devices, vertically aligned LCDs, and polarization compensators in combination to provide high-contrast output.

SUMMARY OF THE INVENTION

Briefly, according to one aspect of the present invention a display apparatus comprises a light source for forming a beam of light. A pre-polarizer polarizes the beam of light to provide a polarized beam of light. A wire grid polarizing beamsplitter receives the polarized beam of light. The polarized beam of light transmits a first polarization for reflecting the polarized beam of light that has a second polarization. A reflective liquid crystal device selectively modulates the polarized beam of light that has a first polarization to encode image data in order to form a modulated beam, and for reflecting the modulated beam back to the wire grid polarizing beamsplitter. A compensator is located between the wire grid polarization beamsplitter and the reflective liquid crystal device. The liquid crystal device conditions oblique and skew rays of the modulated beam reflected from the wire grid polarizing beamsplitter. The wire in the polarizing beamsplitter reflects the compensated modulated beam. Image-forming optics form an image from the modulated beam.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
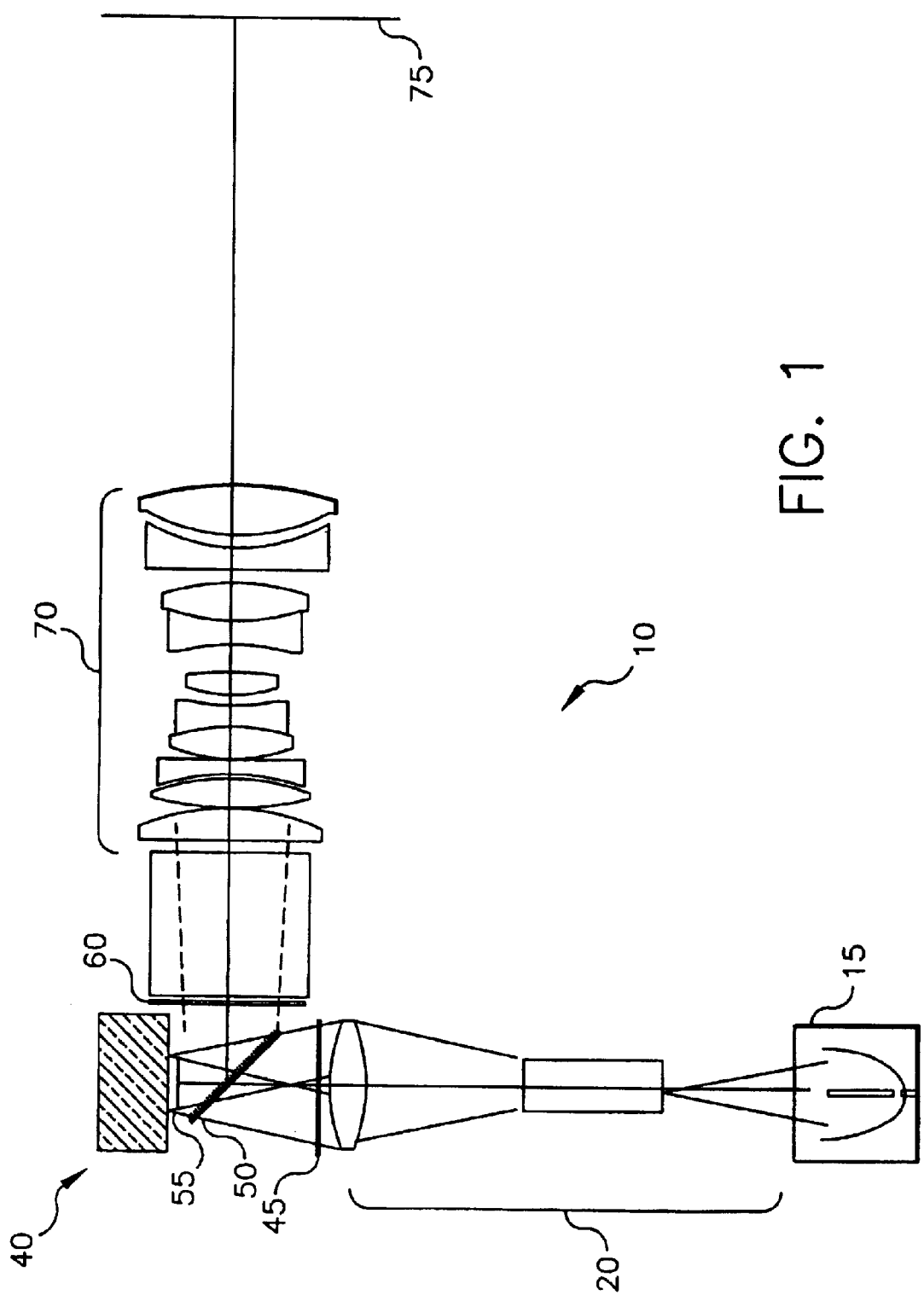
FIG. 1 is a schematic view showing an arrangement of optical components in a projection apparatus.

Referring to FIG. 1, there is shown in schematic form the arrangement of optical components in a digital projection apparatus 10, as described in commonly-assigned copending U.S. patent application Ser. No. 09/813,207, filed Mar. 20, 2001, entitled DIGITAL CINEMA PROJECTOR, by Kurtz et al., the disclosure of which is incorporated herein. Illumination optics 20 and pre-polarizer 45 precondition light from a light source 15 to provide illumination that is essentially uniformized and polarized. Illumination optics 20 includes uniformizing optics, such as an integrating bar or a fly's eye integrator assembly, and condensing relay optics assembly. This light is subsequently polarized by pre-polarizer 45, with light of the desired polarization state directed towards the polarization beamsplitter, while the rejected alternate polarization state light nominally reflects back towards the light source. Pre-polarizer 45 is part of modulation optical system 40, which also comprises a wire grid polarization beamsplitter 50, a polarization rotating spatial light modulator 55, and a polarization analyzer 60. Nominally, wire grid polarization beamsplitter 50 transmits the incident light having the preferred polarization state, while reflecting residual incident light having the alternate polarization state out of the system. Incident light is modulated by spatial light modulator 55, which is nominally a liquid crystal display (LCD), to encode a two-dimensional image onto the light, which is then reflected as a modulated light beam. Wire grid polarization beamsplitter 50 reflects light from the modulated light beam having one polarization state, and transmits the light having the alternate polarization state. Projection optics 70 then directs the reflected modulated light beam onto a display surface 75, which is nominally a projection screen.

Figure 2:
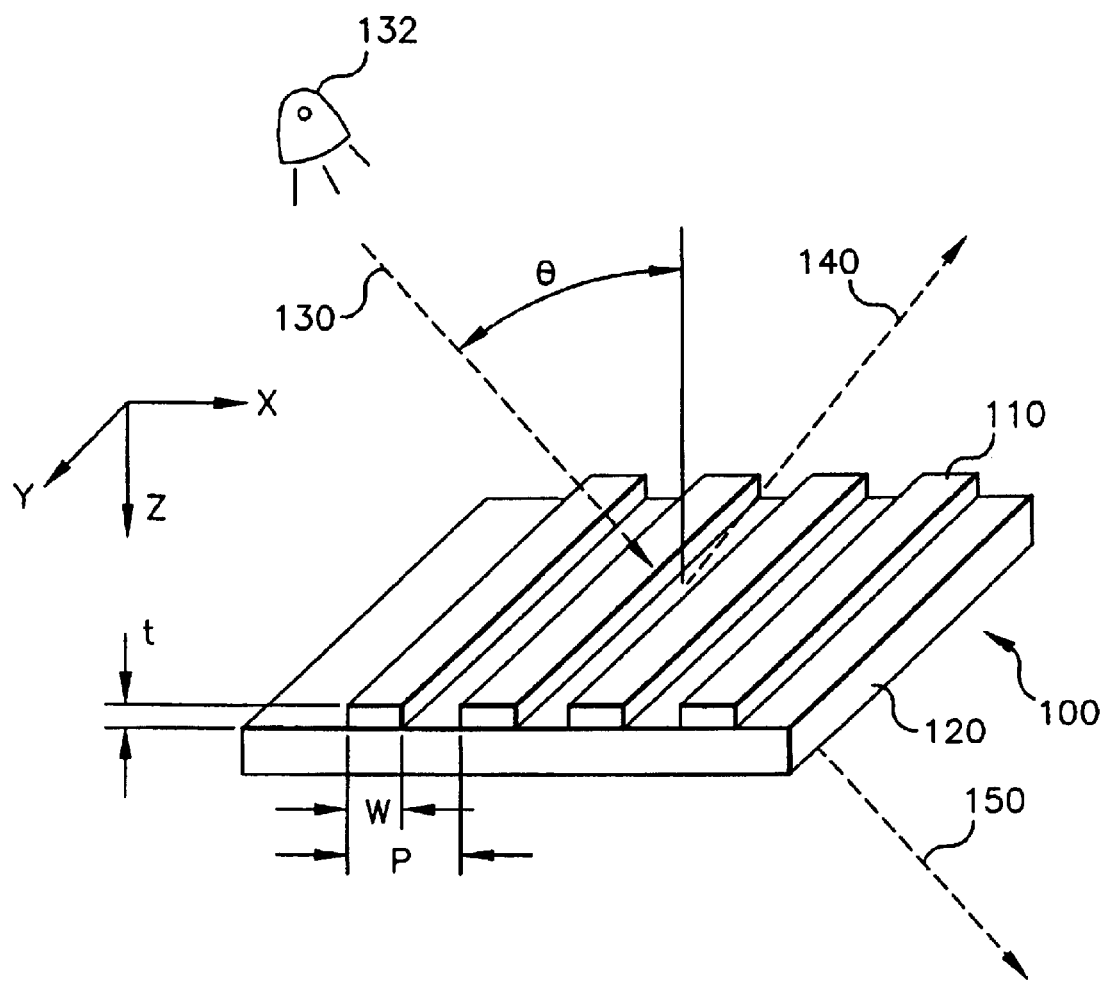
FIG. 2 is a perspective view of a prior art wire grid polarizer.

The design of digital projection apparatus 10 and modulation optical system 40 both can be better understood from a deeper discussion of the properties of the wire grid polarizers used within these systems. FIG. 2 illustrates a basic prior art wire grid polarizer and defines terms that will be used in a series of illustrative examples of the prior art and the present invention. The wire grid polarizer 100 is comprised of a multiplicity of parallel conductive electrodes (wires) 110 supported by a dielectric substrate 120. This device is characterized by the grating spacing or pitch or period of the conductors, designated (p); the width of the individual conductors, designated (w); and the thickness of the conductors, designated (t). Nominally, a wire grid polarizer uses sub-wavelength structures, such that the pitch (p), conductor or wire width (w), and the conductor or wire thickness (t) are all less than the wavelength of incident light ($\lambda$). A beam of light 130 produced by a light source 132 is incident on the polarizer at an angle $\theta$ from normal, with the plane of incidence orthogonal to the conductive elements. The wire grid polarizer 100 divides this beam into specular non-diffracted outgoing light beams; reflected light beam 140 and transmitted light beam 150. The definitions for S and P polarization used are that S polarized light is light with its polarization vector parallel to the conductive elements, while P polarized light has its polarization vector orthogonal to the conductive elements. In general, a wire grid polarizer will reflect light with its electric field vector parallel ("S" polarization) to the grid, and transmit light with its electric field vector perpendicular ("P" polarization) to the grid. Wire grid polarizer 100 is a somewhat unusual polarization device, in that it is an E-type polarizer in transmission (transmits the extraordinary ray) and O-type polarizer in reflection (reflects the ordinary ray).

When such a device is used at normal incidence ($\theta=0$ degrees), the reflected light beam 140 is generally redirected towards the light source 132, and the device is referred to as a polarizer. However, when such a device is used at non-normal incidence (typically $30°<\theta<60°$), the illuminating beam of light 130, the reflected light beam 140, and the transmitted light beam 150 follow distinct separable paths, and the device is referred to as a polarization beamsplitter. The detailed design of a wire grid device, relative to wire pitch (p), wire width (w), wire duty cycle (w/p), and wire thickness (t), may be optimized differently for use as a polarizer or a polarization beamsplitter. It should be understood that both digital projection apparatus 10 and modulation optical system 40, when designed with polarization modifying spatial light modulators, may use polarization analyzers and polarization beamsplitters other than wire grid type devices. For example, the polarization beamsplitter may be a MacNeille type glass prism, or the polarizer may be either a dye/polymer based sheet polarizer. Within this discussion, the polarizing beamsplitter is assumed to be a wire grid type device, while both the pre-polarizer 45 and analyzer 60 are also generally considered to be wire grid devices as well, although that is not required for all configurations for the projector.

Figure 3:
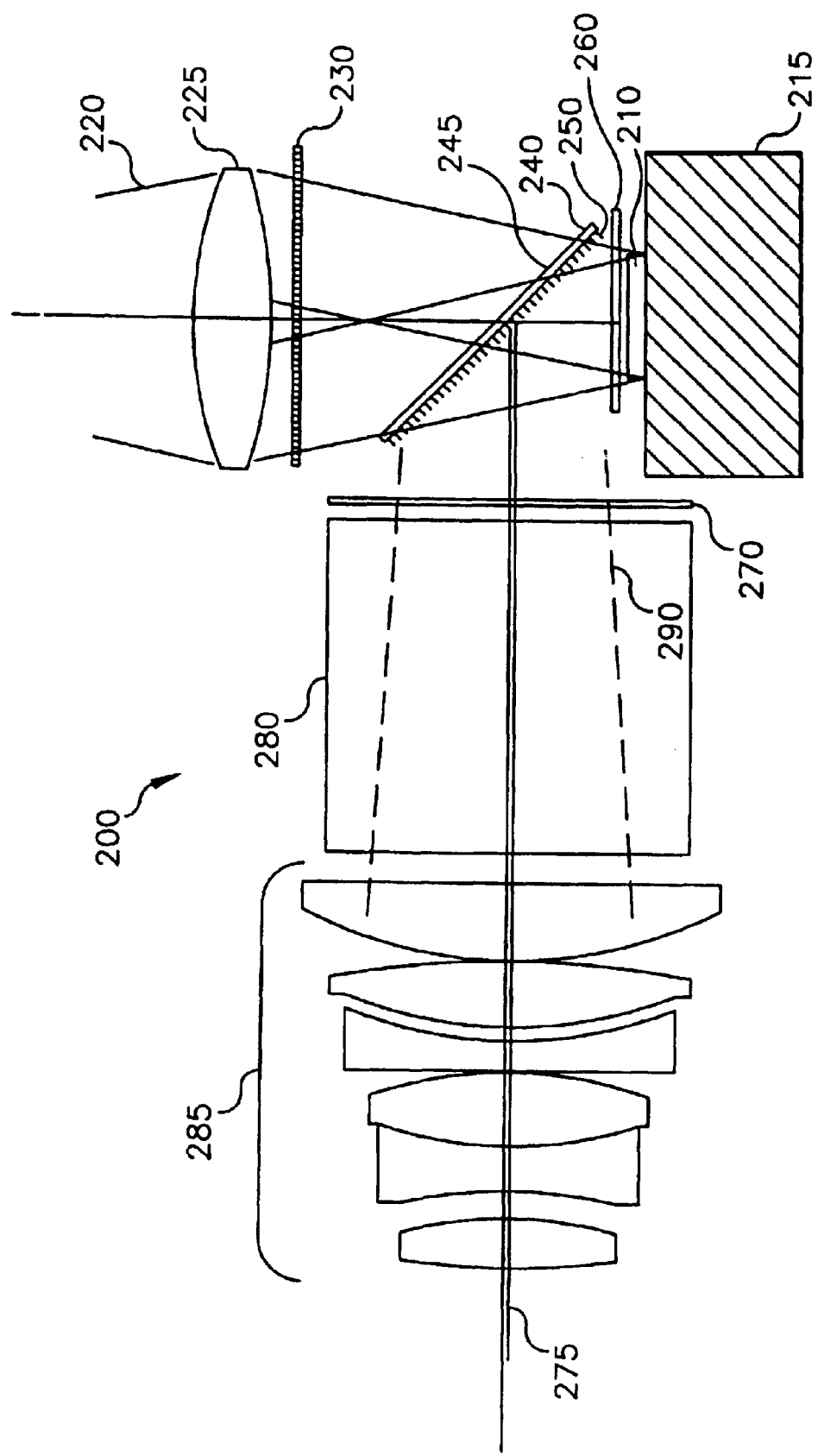
FIG. 3 is a cross sectional view showing a modulation optical system which includes a wire grid polarization beamsplitter.

The preferred spatial relationships of these polarizers, as used in a modulation optical system 200, are illustrated in FIG. 3. The basic structure and operation of modulation optical system 200 are described in commonly-assigned copending U.S. patent application Ser. No. 09/813,207, filed Mar. 20, 2001, entitled DIGITAL CINEMA PROJECTOR, by Kurtz et al., the disclosure of which is incorporated herein. Modulation optical system 200, which is a portion of an electronic projection system, comprises an incoming illumination light beam 220, focused through pre-polarizer 230, wire grid polarization beamsplitter 240, a compensator 260, and onto spatial light modulator 210 (the LCD) by a condensor 225. A modulated, image-bearing light beam 290 is reflected from the surface of spatial light modulator 210, transmitted through compensator 260, reflected off the near surface of wire grid polarization beamsplitter 240, and is subsequently transmitted through a polarization analyzer 270. After leaving modulation optical system 200, modulation image bearing light beam 290 follows along optical axis 275, and is transmitted through recombination prism 280 and projection lens 285 on its way to the screen. Pre-polarizer 230 and polarization analyzer 270 are assumed to both be wire grid polarization devices. A full color projection system would employ one modulation optical system 200 per color (red, green, and blue), with the color beams re-assembled through the recombination prism 280. Condensor 225, which will likely comprise several lens elements, is part of a more extensive illumination system which transforms the source light into a rectangularly shaped region of nominally uniform light which nominally fills the active area of spatial light modulator 210.

In a modulation optical system 200 utilizing a prior art wire grid polarization beamsplitter, the wire grid polarization beamsplitter 240 consists of a dielectric substrate 245 with sub-wavelength wires 250 located on one surface (the scale of the wires is greatly exaggerated). Wire grid polarization beamsplitter 240 is disposed for reflection into projection lens system 285, thereby avoiding the astigmatism and coma aberrations induced by transmission through a tilted plate. Compensator 260 is nominally a waveplate which provides a small amount of retardance needed to compensate for geometrical imperfections and birefringence effects which originate at the surface of spatial light modulator 210. For example, as discussed in U.S. Pat. No. 5,576,854 (Schmidt et al), compensator 260 may provide 0.02 λ's of retardance (A-plate) to correct for polarization errors caused by residual geometrical imperfections of the LCD polarizing layer and residual thermally induced birefringence within the counter electrode substrate within the LCD package. In less demanding applications than digital cinema, compensator 260 may prove optional.

The construction of modulation optical system 200, as used in a digital cinema application, is defined both by the system specifications and the limitations of the available wire grid polarizing devices. In particular, digital cinema requires the electronic projector to provide high frame sequential system contrast (1,000:1 or better). To accomplish this, the polarization optical components, excluding spatial light modulator 210 (the LCD) of modulation optical system 200 must provide a total optical system contrast (Cs) of ~2,000:1. The actual target contrast for the polarization optics does depend on the performance of the LCDs. Thus, if for example, the LCDs provide only ~1500:1 contrast, then the polarization optics must provide ~3,000:1 contrast. For example, an LCD with vertically aligned molecules is preferred for the digital cinema application due to its high innate contrast. Notably, the contrast performance of both the LCDs and the polarization optics typically decrease with increasing numerical aperture of the incident beam. Unfortunately, with today's technologies it is not sufficient to use just a single wire grid polarization beamsplitter 240 by itself in order to meet the 2,000:1 target contrast for the polarization optics. For this reason, modulation optical system 200 also uses a wire grid pre-polarizer 230 and a wire grid polarization analyzer 270 to provide the target polarization performance.

The construction and operation of modulation optical system 200 can be understood in yet greater detail, relative to its polarization performance. Preferably, pre-polarizer 230 is oriented to transmit "P" polarized light into the modulation optical system. Wire grid polarization beamsplitter 240 is oriented with its sub-wavelength wire pattern oriented nominally parallel to the sub-wavelength wires of polarizer 230 (that is, the two devices are not crossed). Thus, the transmitted "P" light is further modified (contrast enhanced) by transmission through the wire grid polarization beamsplitter. The transmitted light beam then passes through compensator 260 and encounters spatial light modulator 210, which is nominally a reflective LCD, which modifies the polarization state of the incident light on a pixel to pixel basis according to the applied control voltages. Intermediate code values, between white and black, reduce the amount of "On" state and increase the amount of "Off" state light. The "On" state light, which has been polarization rotated, is in the "S" polarization state relative to the wire grid beamsplitter 240. Thus the "S" state light reflects off the wire grid polarization beamsplitter 240, is subsequently transmitted through an optional compensator 265 (see FIGS. 5a and 10) and polarization analyzer 270, and directed to the screen by a projection lens 285. The overall contrast (Cs) for modulation optical system 200 (ignoring the LCD and compensator contributions) can be approximated by:

$$1/Cs = 1/(C_{T1}*C_{T2}) + 1/(C_{R2}*C_{T3})$$

where $C_{T1}$ is the transmitted contrast of the wire grid pre-polarizer 230, $C_{T2}$ and $C_{R2}$ are transmitted and reflected contrast ratios for the wire grid polarization beamsplitter 240, and $C_{T3}$ is the transmitted contrast for the wire grid polarization analyzer 270. In this system, the overall contrast is largely determined by the low reflected contrast ratio $C_{R2}$ for "S" polarization state light off of wire grid polarization beamsplitter 240. The analyzer contrast $C_{T3}$ needs to be quite high to compensate for the low $C_{R2}$ values (~30:1). Whereas the transmitted contrasts $C_{T1}$ and $C_{T2}$ do not need to be particularly high, provided that the respective contrast values are reasonably uniform over the spectrum. Polarization analyzer 270 is oriented so that the "On" state light, which reflects off the wire grid polarization beamsplitter 240 and has "S" polarization relative to the wire grid polarization beamsplitter 240, sees this same light as "P" state light relative to its own structure. Polarization analyzer 270 therefore removes any alternate polarization leakage light accompanying the desired "On" state beam.

As an example, in green light at 550 nm, wire grid pre-polarizer 230 has an angle averaged polarization contrast ratio of ~250:1. When used in combination, wire grid polarization beamsplitter 240 and wire grid pre-polarizer 230 produce an on screen frame sequential optical contrast ratio of ~25:1, which falls way short of the system requirements. Thus, the polarization performance of overall modulation optical system 200 is also supported with the addition of wire grid polarization analyzer 270, which is nominally assumed to be identical to wire grid polarizer 230. Polarization analyzer 270 removes the leakage of light that is of other than the preferred polarization state, boosting the theoretical overall system contrast Cs to ~2900:1. Performance does vary considerably across the visible spectrum, with the same combination of wire grid polarizing devices providing ~3400:1 contrast in the red spectrum, but only ~900:1 contrast in the blue. Certainly, this performance variation could be reduced with the use of color band tuned devices, if they were available.

Modulation optical system 200 is best constructed with wire grid polarization beamsplitter 240 oriented with the surface with the sub-wavelength wires 250 facing towards the spatial light modulator 210, rather than towards the illumination optics (condenser 225) and light source (see FIG. 3). While the overall contrast (Cs) is ~2,900:1 when this orientation is used, the net contrast drops precipitously to ~250:1 when the alternate orientation (wires on the surface towards the light source) is used. This difference in overall contrast when modulation optical system 200 is constructed with the image light reflecting off the wire grid polarization beamsplitter 240, as a function of whether the sub-wavelength wires 250 face the spatial light modulator or the light source, may be less important for slower (larger f#) systems. Additionally, referring to FIG. 3, modulation optical system 200 provides the highest contrast and light efficiency when the sub-wavelength wires 250 of wire grid polarization beamsplitter 240 are oriented "vertically" ("into the page", as shown), rather than "horizontally" (within the plane of the page). Wire grid polarization beamsplitter 240 can also be rotated (about the surface normal) by a few degrees to tune the contrast performance.

Figure 4:
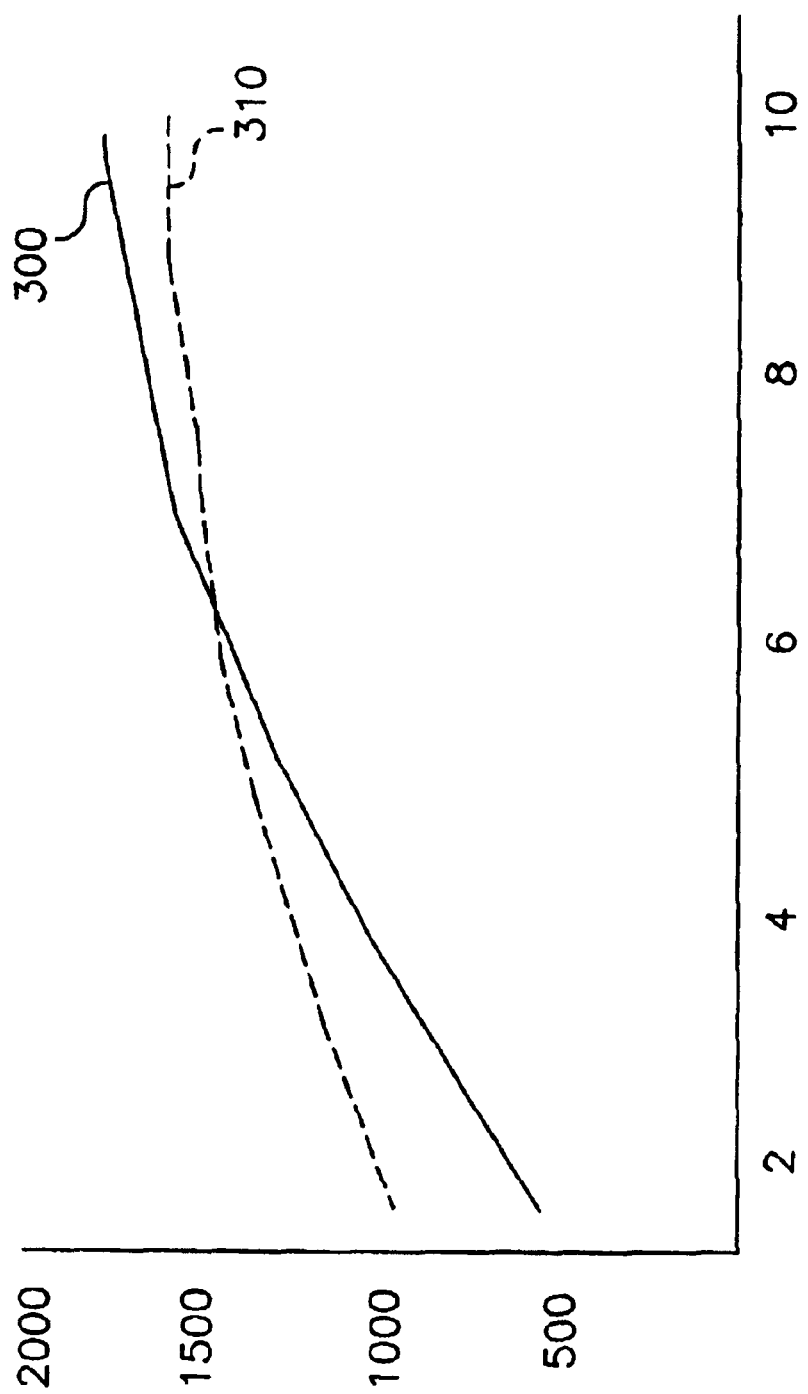
FIG. 4 is a graph showing the relationship of contrast ratio to F/# for a modulation optical system which includes both a wire grid polarization beamsplitter and an LCD, both with and without polarization compensation.

In order to build a digital cinema projector it is necessary to simultaneously maximize luminance (10,000–15,000 lumens) and contrast (1,000:1+) with a system illuminating 35–55 ft. wide screens, while dealing with the limitations of the various optics, wire grid devices and LCDs. Luminance can be maximized by increasing the acceptance angle (numerical aperture) of light incident at the wire grid polarization beamsplitter and the LCD. With a wider acceptance angle (or a lower F#), the projection optics are able to gather more light. However, at the same time, the wider the angle of source light incident at wire grid polarization beamsplitter, the larger the leakage light from other polarization states and thus the smaller the contrast ratio (CR) available. Referring to FIG. 4, there is shown a graph of contrast for modulation optical system 200 (including wire grid pre-polarizer 230, wire grid polarization beamsplitter 240, a VA LCD, and a wire grid polarization analyzer 270) vs. the F# of the light transmitted through the system. The plot of system contrast 300 shows that at approximately F/2.3, a contrast ratio of ~600:1 is achieved. This value is significantly less than the 1,000:1$^+$ contrast needed for digital cinema projection. However, efficiency calculations suggest that an LCD based digital cinema projector will need to operate below F/3.0 to meet the screen luminance targets, with systems speeds of F/2.0 to F/2.3 being potentially required for the larger screens.

Figure 5A:
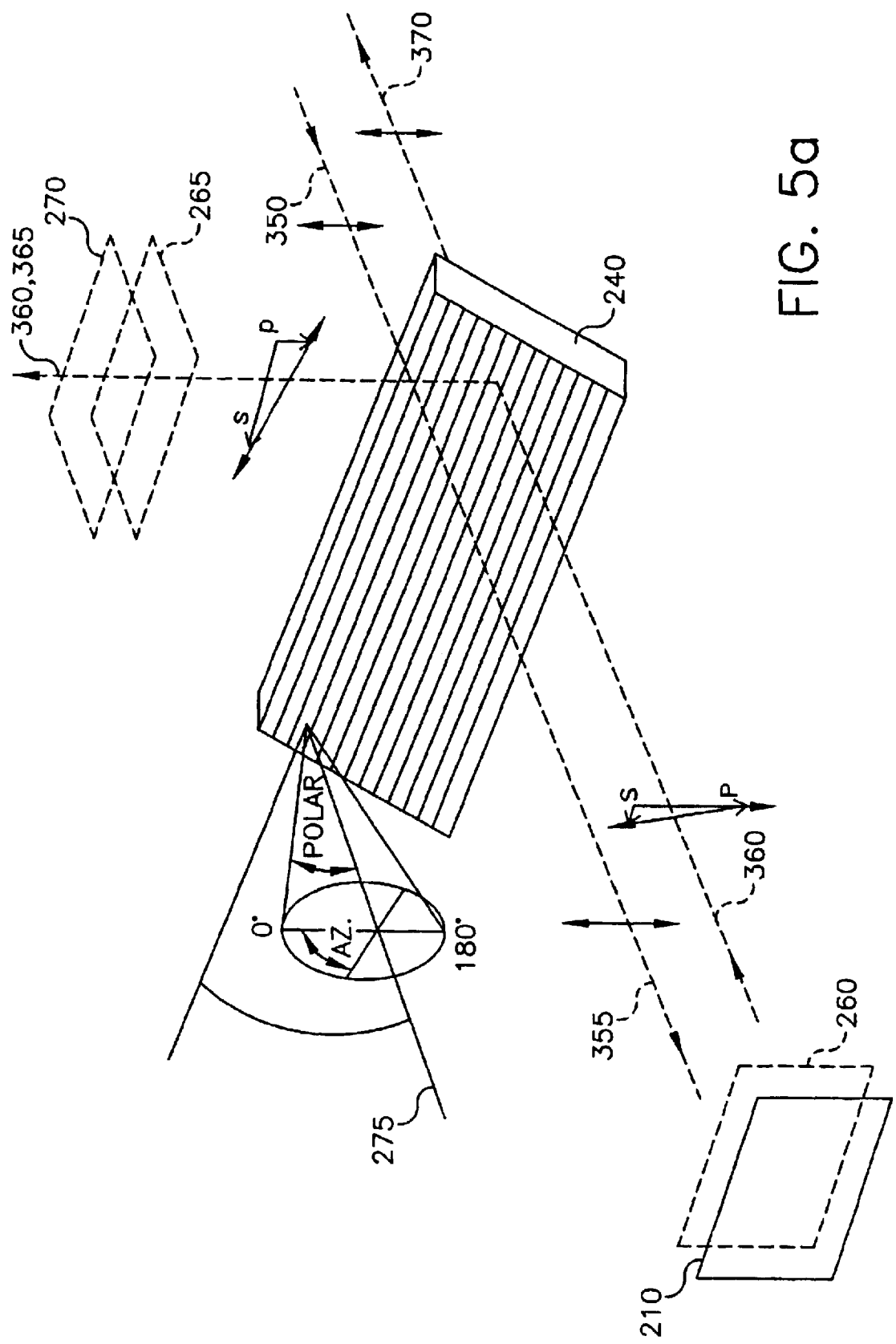
FIG. 5a shows the geometry of incident light relative to the wire grid polarizing beamsplitter and an LCD.

Referring to FIG. 5a, there is shown a perspective view representing light polarization states for light reflected by and transmitted through wire grid polarization beamsplitter 240 within a modulation optical system, for a pixel of LCD 210. A collimated or specular pre-polarized beam 350 is transmitted through wire grid polarization beamsplitter 240. As shown in FIG. 5a, the electric field polarization of transmitted beam 355 is on a vector perpendicular to the wire grid of wire grid polarization beamsplitter 240. A returning modulated beam 360 is reflected from the pixel on LCD 210, where the "S" polarized light is the image data, and the "P" polarized light is to be rejected. Ideally, wire grid polarization beamsplitter 240 transmits 100% of the unwanted "p" light as a modulated transmitted light 370. However, a small leakage light 365 is reflected from wire grid polarization beamsplitter 240 and accompanies "s" modulated beam 360, causing reduced contrast (ratio of "s" to "p"). Relative to the modulated beam 360, wire grid beamsplitter acts as a pre-polarizer in transmission and a polarization analyzer in reflection, comprising the typical crossed polarizer configuration.

Figure 5B:
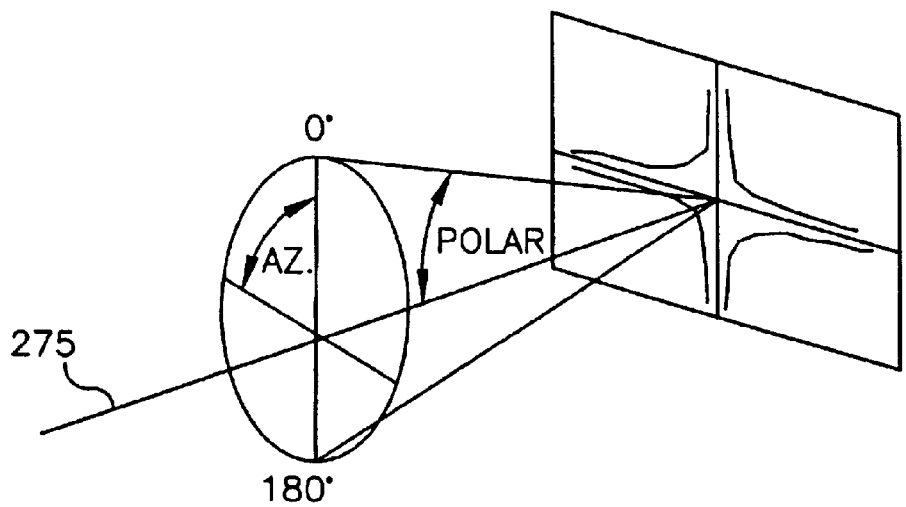
FIG. 5b illustrates the geometry of normally incident light relative to the polarization states of crossed polarizers.

While some loss of polarization contrast does occur with on axis collimated light, the effects are more dramatic for oblique and skew rays. To better understand this, FIG. 5a includes an illustration of the beam geometry for a large NA non-specular beam incident on a 45° tilted surface of wire grid polarization beamsplitter 240, while FIG. 5b shows the geometry for a beam incident normal to a surface (such as the LCD 210, pre-polarizer 230 or analyzer 270). For the normally incident case, the incoming beam is described by an azimuthal sweep of 0–180°, while the polar sweep of angles is limited (0–15° for F/2.0). The oblique rays are those rays that fall in the four quadrants outside the axes (azimuthal angles 0° and 180°, 90° and 270°) defined by the crossed polarizers, and which lie in planes which contain the local optical axis 275. The skew rays are the rays that lie in planes that do not contain the local optical axis 275. For the case of incidence to the 45° tilted surface, the incoming beam is again defined by an azimuthal sweep of 0–180°, while the polar sweep of angles covers ~0–15° relative to the optical axis, or a sweep of ~30–60° relative to the wire grid surface. This beam geometry will be important in appreciating the results given by FIGS. 8a–i.

Figure 6A:
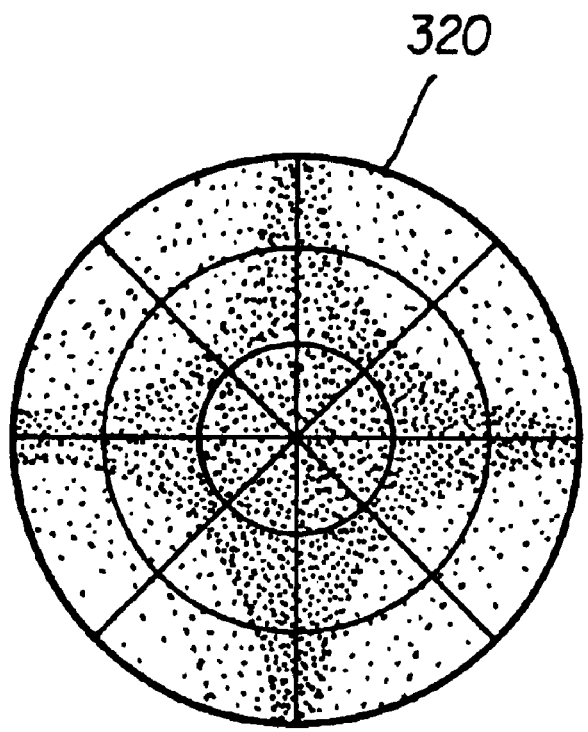
FIGS. 6a and 6b show the angular response for crossed wire grid polarizers without polarization compensation.

FIG. 6a illustrates the polarization contrast profile for crossed polarizers, visible in angular space, and known as the "iron cross". The iron cross pattern 320 demonstrates peak extinction in directions parallel and perpendicular to the grid of the analyzer, and diminished extinction for the skew rays and oblique rays in the four off-axis quadrants. As the wire grid polarization beamsplitter has superior angular performance when compared to most existing polarizers, these devices have been generally considered to not have a skew ray problem, and therefore to not require further polarization compensation. This is in part because the wire grid polarization beams splitter functions as an O-type polarizer in reflection and an E-type polarizer in transmission, and therefore is partially self compensating when used in both transmission and reflection as in modulation optical system 200. However, even so, the extinction of the wire grid polarization beamsplitter is still not adequate for demanding applications like digital cinema.

In the original electronic projection systems that were developed utilizing reflective liquid crystal displays, each LCD was addressed from behind using a CRT. Today, state of the art reflective LCDs are directly electronically addressed by means of a silicon backplane. These modern devices, which are known as liquid crystal on silicon (LCOS) displays, generally comprise a silicon substrate, which is patterned with pixel addressing circuitry, over coated with reflective and light blocking layers, followed by an LCD alignment layer, a thin (~5 μm) layer of liquid crystal, and an anti-reflection (AR) coated cover glass. The inside surface of the cover glass for a VA LCD has an ITO electrode addressing layer and an alignment layer on the internal surface, abutting the liquid crystal layer. The optical performance of an LCD depends on many design parameters, including the material properties of the liquid crystals, the electrode structure, the pixel patterning and proximity, the ON state and OFF state orientations of the liquid crystal molecules, the use and construction of the alignment layers, the optical properties of the reflective, anti-reflective, and light blocking layers, etc. For example, while the liquid crystal molecules are nominally vertical to the inside surfaces of the silicon substrate and the cover glass, in actuality the surface adjacent molecules are oriented with a residual tilt of 1–2 degrees from the normal. If this residual tilt angle becomes larger, device contrast starts to suffer.

Figure 6B:
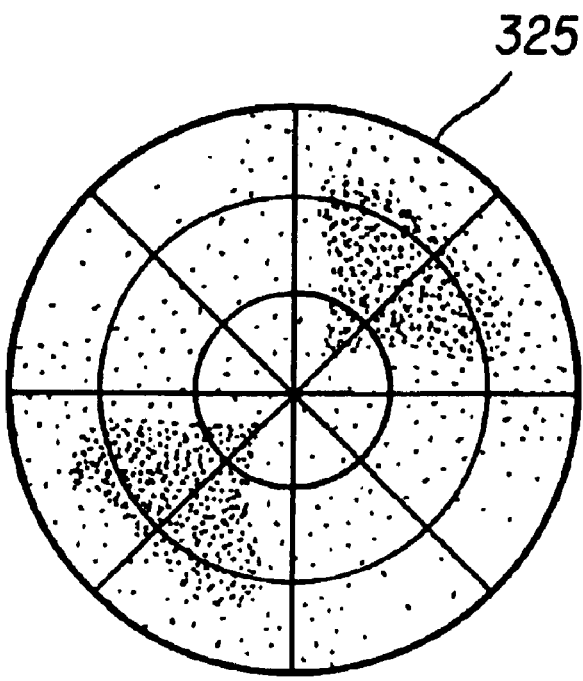

The "iron cross" illustration of FIG. 6a also represents the nominal polarization response of an ideal VA LCD, as seen through crossed polarizers, assuming it has a negligible tilt angle. However, the net contrast provided by the modulation optical system can be degraded by various subtle effects within either the LCDs (large tilt angles, bias voltages for the OFF state, thermally induced stresses, and large incident angles (large NA's)) or within the polarization devices, including the wire grid polarization beamsplitter (such as wire surface orientation, wire rotation, and large incident angles (large NA's). These effects can either cause the contrast to be generally reduced while the iron cross pattern 320 is retained, or cause the iron cross pattern 320 to be deformed into another extinction pattern (a "baseball" pattern 325 shown in FIG. 6b, for example). In the case of modulation optical system 200, which partially comprises a wire grid pre-polarizer 230, a wire grid polarization beamsplitter 240, a vertically aligned LCD 210, and a wire grid polarization analyzer 270, the nominal system only provides ~600:1 contrast in the green at F/2.3, which is below specification. The system contrast can be enhanced, to meet and exceed specification, through the use of the appropriate compensators. Certainly polarization contrast can be potentially enhanced by making design changes to the actual polarization devices (the wire grid polarization beamsplitter and the LCDs) themselves. However, as it is not always possible or easy to alter the fundamental design, manufacturing, and performance limitations of these devices, alternate methods of improving contrast have been sought. In particular, the contrast performance of modulation optical system 200 has been enhanced with new polarization compensators developed specifically to work with wire grid polarizers, and with new polarization compensators developed specifically to work with the combination of vertically aligned LCDs and wire grid devices.

Figure 7A:
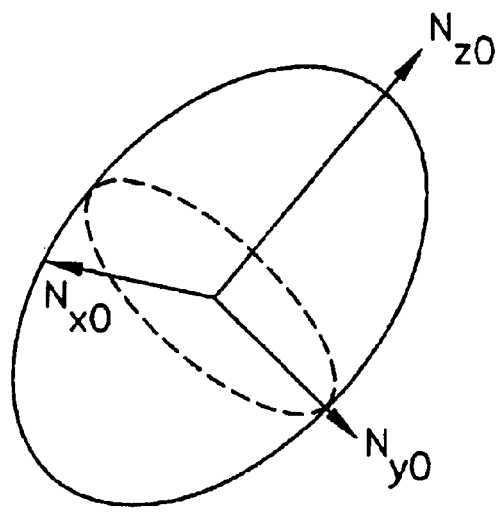
FIGS. 7a–e show the possible axial orientations and construction of a polarization compensator.
Figure 7B:
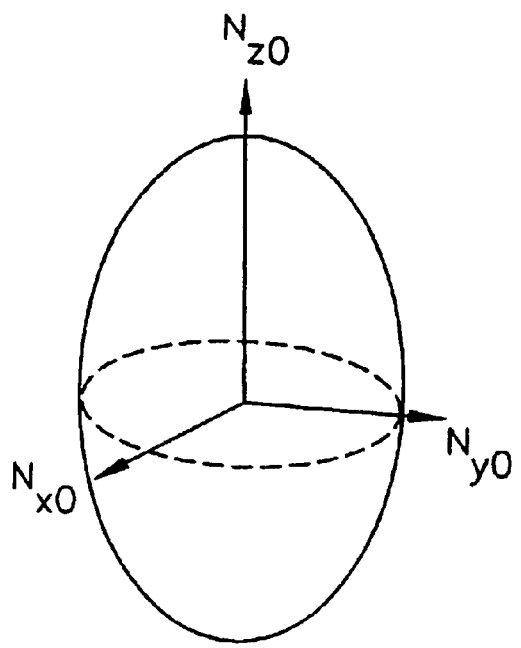

Compensators and polarizers are constructed from birefringent materials, which have multiple indices of refraction. Comparatively, isotropic media (such as glass) have a single index of refraction, and uniaxial media (such as liquid crystals) have two indices of refraction. Optical materials may have up to three principle indices of refraction. The materials with all three different refractive indices are called biaxial, and are uniquely specified by its principal indices $nx_0$, $ny_0$, $nz_0$, and three orientational angles as shown in FIG. 7a. FIG. 7b shows a biaxial film with the axes of $nx_0$, $ny_0$, and $nz_0$ aligned with x, y, and z axes, respectively. The materials with two equal principal refractive indices are called uni-axial materials. These two equal indices are ordinary index and referred as $n_0$. The other different refractive index is called an extraordinary index $n_e$. The axis of $n_e$ is also referred to as an optical axis. Uniaxial materials are uniquely characterized by $n_e$, $n_0$, and two angles describing the orientation of its optical axis. When all three principal indices are equal, the materials are called isotropic.

Figure 7C:
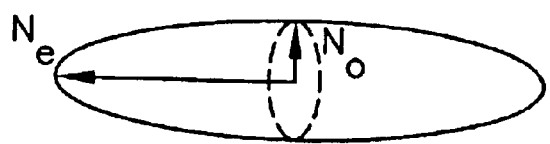
Figure 7D:
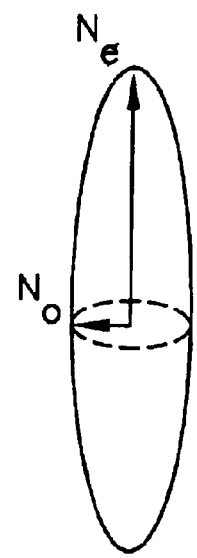
Figure 7E:
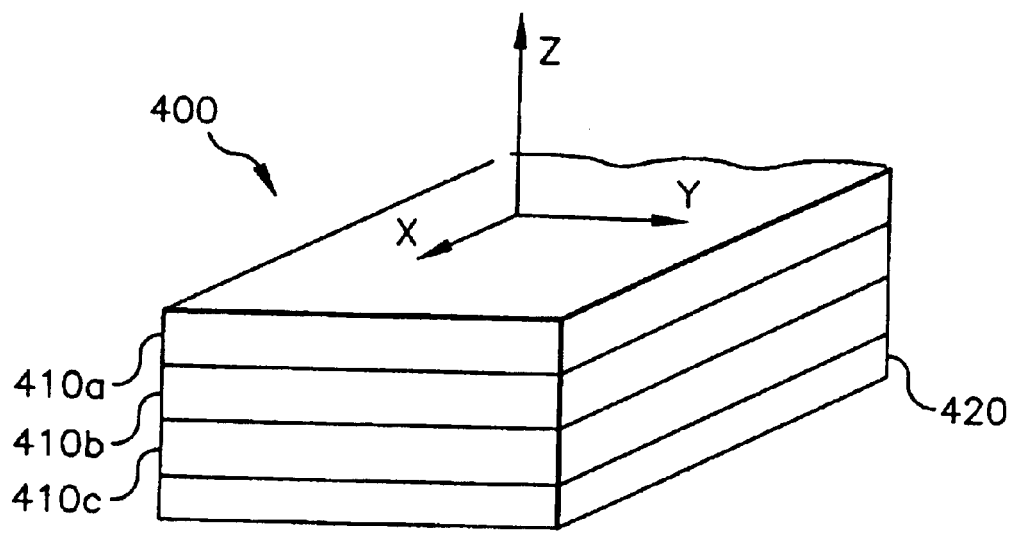

Light sees varying effective indices of refraction depending on the polarization direction of its electric field when traveling through a uniaxial or biaxial material, consequentially, a phase difference is introduced between two eigen-modes of the electric field. This phase difference varies with the propagation direction of light, so the transmission of the light varies with angle when uniaxial or biaxial materials are placed between two crossed polarizers. These phase differences translate into modifications of the local polarization orientations for rays traveling along paths other than along or parallel to the optical axis. In particular, a compensator modifies or conditions the local polarization orientations for rays at large polar angles, which also includes both oblique and skew rays. A liquid crystal material is typically a uniaxial material. When it is sandwiched between two substrates as in a liquid crystal display, its optic axis generally changes across the thickness depending on its anchoring at the substrates and the voltage applied across the thickness. A compensator is constructed with one or more uniaxial and/or biaxial films, which are designed to introduce angularly dependent phase differences in a way to offset the angle dependence of phase difference introduced by liquid crystals or other optics. As is well known in the art, a uniaxial film with its optic axis parallel to the plane of the film is called a A-plate as shown in FIG. 7c, while a uniaxial film with its optic axis perpendicular to the plane of the film is called a C-plate, as shown in FIG. 7d. A uniaxial material with $n_e$ greater than $n_0$ is called a positively birefringent. Likewise, a uniaxial material with $n_e$ smaller than $n_0$ is called negatively birefringent. Both A-plates and C-plates can be positive or negative depending on their $n_e$ and $n_0$. A more sophisticated multi-layer compensator 400 has its optic axis or three principal index axes varying across its thickness, as in FIG. 7e, where a stack of compensation films (birefringent layers 410a, 410b, and 410c) are used with a substrate 420 to assemble the complete compensator. A detailed discussed of stack compensation can be found in U.S. Pat. No. 5,619,352 (Koch et al.). As is well known in art, C-plates can be fabricated by the use of uniaxially compressed polymers or casting acetate cellulose, while A-plates can be made by stretched polymer films such as polyvinyl alcohol or polycarbonate.

The combination of crossed wire grid polarizers (wire grid polarization beamsplitter 240, wire grid pre-polarizer 230, and wire grid polarization analyzer 270) in modulation optical system provides an excellent dark state for light traveling in the planes parallel or perpendicular to the wires. However, a maximum amount of light leakage occurs when light travels at a large polar angle (theta) away from the polarizer normal direction and 45/135 degree relative to the wires (FIG. 5b shows the polar and azimuthal geometry for the polarizers). For example, with reference to FIG. 6a, for the standard "iron cross" type extinction pattern, peak contrast along the axes can exceed 1,000:1, while contrast in the four quadrants located 45 degrees off the crossed coordinate axes falls off to 300:1 or less. Light transiting these angular regions, which includes skew rays, experiences less extinction than light closer to the axes. This loss of contrast from the quadrant rays and the skew rays can be significant for digital cinema projection, which again requires high optical system contrast (>2,000:1) and fast optics (<F/3.0).

Wire grid polarizers have been studied by the use of effective medium theory ("Generalized model for wire grid polarizers", Yeh, SPIE Vol. 307, (1981), pp. 13–21). When the grating pitch (p) is much smaller than the wavelength (λ), the subwavelength grating can be approximately considered as an uni-axial film with effective refractive indices. Although effective medium theory is much easier to be implemented and provides a qualitative understanding of wire grid polarizers, it generally fails to obtain accurate results. It is especially true for calculation of very low transmission through crossed wire grid polarizers. The limitation of effective medium theory has been pointed out by Kihuta et al. ("Ability and limitation of effective medium theory for subwavelength gratings", Optical Review 2, (1995) pp.92–99). As a result, the wire grid polarizers have been modeled using the more exacting rigorous coupled wave analysis (RCWA) discussed in Kuta et al. ("Coupled-wave analysis of lamellar metal transmission gratings for the visible and the infrared", Kuta, et al., Journal of the Optical Society of America A, Vol. 12, (1995), pp.1118–1127). The results given in FIGS. 8a through 8i for wire grid polarizers are modeled using RCWA.

Figure 8A:
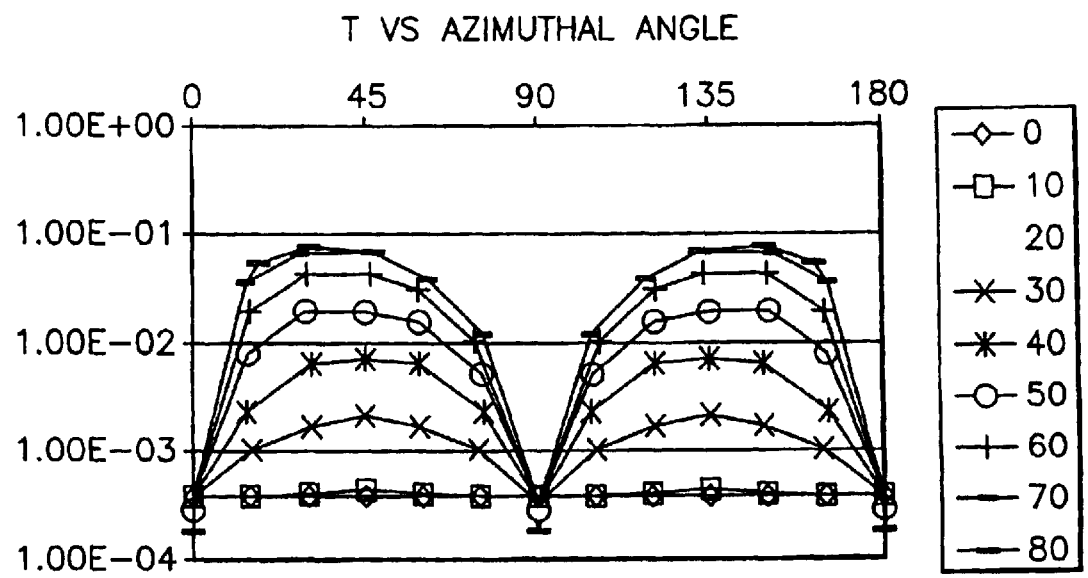
FIGS. 8a–i are the far field angular response plots from various arrangements of wire grid polarization devices and compensators.

FIG. 8a shows the theoretical transmission through crossed wire grid polarizers about normal incidence, and shows that the transmission at a polar angle of 20 deg. (F/1.5) and an azimuthal angle of 45 deg. is $0.99 \times 10^{-3}$, which is 2.5× larger than the transmission of $0.4 \times 10^{-3}$ at a polar angle of 0 deg. For an even larger polar angle, such as 40 deg. (F/0.8), at an azimuthal angle of 45 deg., the transmission loss is much greater, with the value of $5 \times 10^{-3}$. The increased transmission translates into additional light leakage, and thus loss of contrast. For these calculations, the wire grid polarizers were modeled as aluminum wire structures, deposited on Corning glass 1737F, with a wire pitch of 144 nm (~λ/4), a wire duty cycle of 0.45, and a wire height of 130 nm. The wire grid polarizer is modeled in the green at 550 nm, with the refractive index of Al being 0.974+i6.73, and the refractive index of Corning glass is 1.52. These parameters are used for FIG. 8a through FIG. 8i unless specified otherwise. As can be seen in FIG. 8a, the maximum light leakage (reduced contrast) occurs at 45 degrees relative to the wire grid. FIG. 8a can be understood with reference to the geometry of FIG. 5b, which shows that for the normally incident beam, the relevant cone of light is described by an azimuthal sweep of 0–180° and a polar sweep of ~0–20° (F/1.5). The plot of FIG. 8a shows variations in transmission for crossed polarizers vs. azimuthal and polar angles, rather than the variations in contrast. Polarization contrast can be difficult to model in a comprehensive way for a complex system like modulation optical system 200. However, contrast is approximately inversely proportional to the transmission for crossed polarizers, such that small changes in transmitted light can cause huge changes in system contrast. While FIGS. 8a–f also show significant off-angle transmission effects for slower beams (in particular at 10°, or F/2.9), the data will be consistently presented at 20° (F/1.5) for a more dramatic comparison.

Figure 8B:
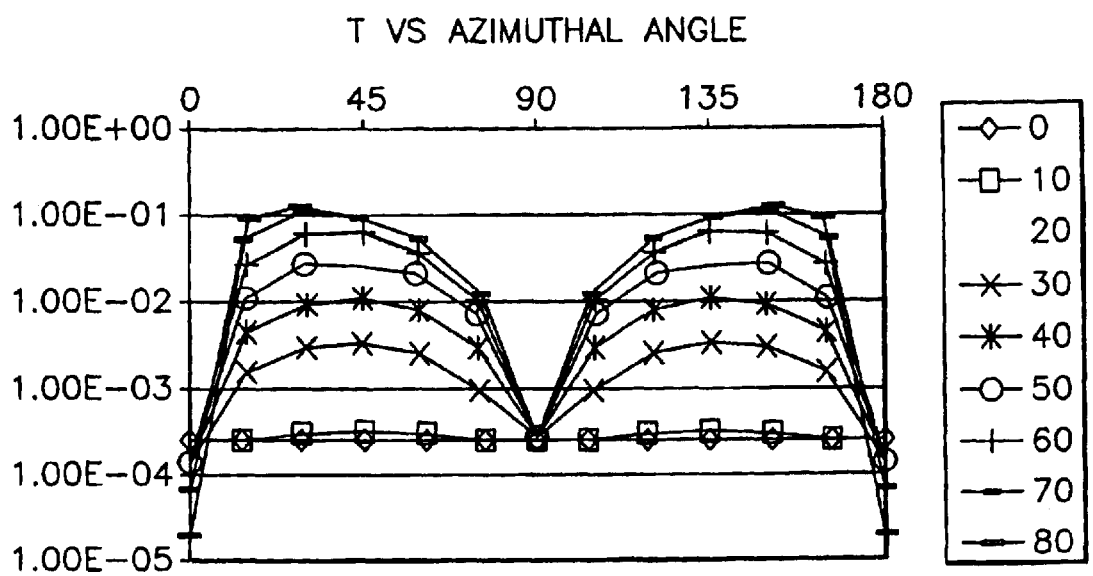

Notably, the general behavior of crossed polarizers to suffer light leakage for oblique and skews rays at large polar angles does not change substantially just by using better polarizers. For example, modeling has shown that even if the pitch of wire grid is much smaller than the wavelength of the light, such as ¹⁄₁₀₀, a significant amount of light still leaks through two crossed wire grid polarizers at large polar angles. FIG. 8b shows the transmission through crossed wire grid polarizers, where the pitch of the wire grid polarizers is 5.5 nm (λ/100). Certainly the fine pitch λ/100 device does show lower transmission than does the λ/4 device ($0.23 \times 10^{-3}$ vs. $0.4 \times 10^{-3}$ at a polar angle of 0 deg.), and thus provides higher contrast (the theoretical contrast differences are much greater than 2× between λ100 and λ/4 devices). In this case, the modeled λ/100 device shows increased transmission (and thus light leakage) at a polar angle of 20 deg. and an azimuthal angle of 45 deg. of $0.95 \times 10^{-3}$, which is ~4× larger than the transmission of $0.23 \times 10^{-3}$ at a polar angle of 0 deg. At a polar angle of 40 degrees (and an azimuthal of 45 degrees), the transmission (light leakage) is 10× greater ($9.7 \times 10^{-3}$). Thus, even for these λ/100 wire grids, which are far finer than what is presently manufacturable, the off axis behavior is largely the same, although the theoretical extinction is greater.

Wire grid polarizers, which transmit the P-polarization as an extraordinary ray (E-type) and reflect the S-polarization as an ordinary ray (O-type), while only absorbing ~10% of the incident light, cannot be accurately treated as a uniaxial film. By comparison, the standard sheet polarizer, which is manufactured by Polaroid Corporation, is similar to the wire grid polarizer in that it uses "wires" (iodine atoms imbedded in stretched PVA plastic), is actually a significantly different device. First, the sub-wavelength "wires" (p<<λ) of the dye sheet polarizer are significantly smaller than wires of the visible wavelength wire grid polarizer (p~/λ4). Moreover, the dye sheet polarizer is an O-type polarizer, which transmits the ordinary wave and absorbs (rather than reflects) the extraordinary wave. The standard dye sheet polarizer can be accurately modeled as a uniaxial film with an extraordinary index and an ordinary index. Optiva Inc. recently developed an E-type sheet polarizers based on supra-molecular lyotropic liquid crystalline material, which transmit the extraordinary wave and absorb the ordinary wave of incident light. (see Lazarev et al., "Low-leakage off-angle in E-polarizers", Journal of the SID, vol. 9, (2001), pp. 101–105). The Optiva polarizer is a sheet polarizer similar to the standard dye sheet polarizer, except that it is an E-type polarizer which transmits the extraordinary wave and absorbs (rather than reflects) the ordinary wave.

When two standard O-type dye sheet Polaroid polarizers are used in the crossed configuration, an iron cross pattern 320 (see FIG. 6a) is also experienced. Light leaks through these conventional crossed sheet polarizers at obliquely incident angles with maximum leakage occurring at 45 degrees relative to the transmission or absorption axes of the sheet polarizers. Various compensators have been proposed to reduce light leakage through crossed O-type polarizers, as published by Chen et al. and in Uchida et al. (T. Ishinabe, T. Miyahita, and T. Uchida, "Novel Wide Viewing Angle Polarizer with High Achromaticity", SID 2000 Digest, pgs. 1094–1097). According to Chen, a combination of uniaxial materials, an A-plate and a C-plate, dramatically reduces light leakage at off angle. One of its design requirements is that the optical axis of the A-plate should be parallel to the transmission axis of the adjacent polarizer. Uchida solves the same problem using two biaxial films to construct the compensator.

Figure 8C:
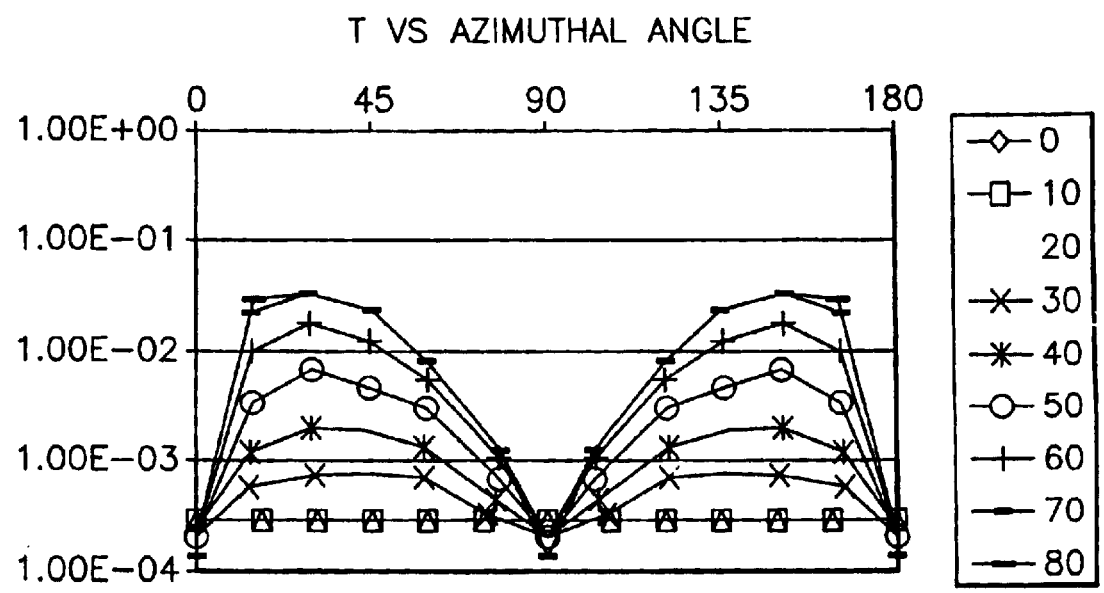

Although wire grid polarizers (E-type polarizer in transmission, O-type in reflection) and standard sheet polarizers (O-type in transmission, E-type absorption) are significantly different devices, benefit might be obtained by combining an existing compensator for a sheet polarizer with crossed wire grid polarizers. FIG. 8c shows the transmission through crossed wire grid polarizers paired with a prior art sheet polarizer compensator from Chen at al., which consists of a 137 nm A-plate and a 80 nm C-plate. For the case of a light beam at a polar angle of 20 deg. (F/1.5) and an azimuthal angle of 45 degrees, this compensator does provides significant improvement, reducing the transmission to $0.52 \times 10^{-3}$, which represents about 30% more light leakage than the on-axis case for an uncompensated crossed polarizers ($0.4 \times 10^{-3}$). However, at greater polar angles, such as 40 degrees (again, an azimuthal angle of 45 degrees) this compensator still allows substantially greater transmission, at a level of $2.4 \times 10^{-3}$, or ~6× greater than the on-axis case. The pitch of the wire grid is again assumed to be 144 nm. Thus, while prior art sheet polarizer compensators can be used in combination with crossed wire grid polarizers to provide some polarization contrast improvement, there is yet room for further improvement.

Fortunately, it is possible to design compensators which are specifically optimized to work with wire grid polarizers and wire grid polarization beamsplitters, and which can be used to boost the contrast provided by modulation optical system 200. When wire grid polarizers are utilized as a polarizing beamsplitter, they first transmit light and then reflect light, or first reflect light and then transmit light. The angle at which light strikes the wire grid polarizer at the first time is generally different from the angle at which light does at the second time. The new compensators have been developed to minimizing light leakage through crossed wire grid polarizers at off angles within modulation optical system 200. Likewise, compensators have been developed which reduce light leakage through a wire grid polarizing beamsplitter.

Figure 8D:
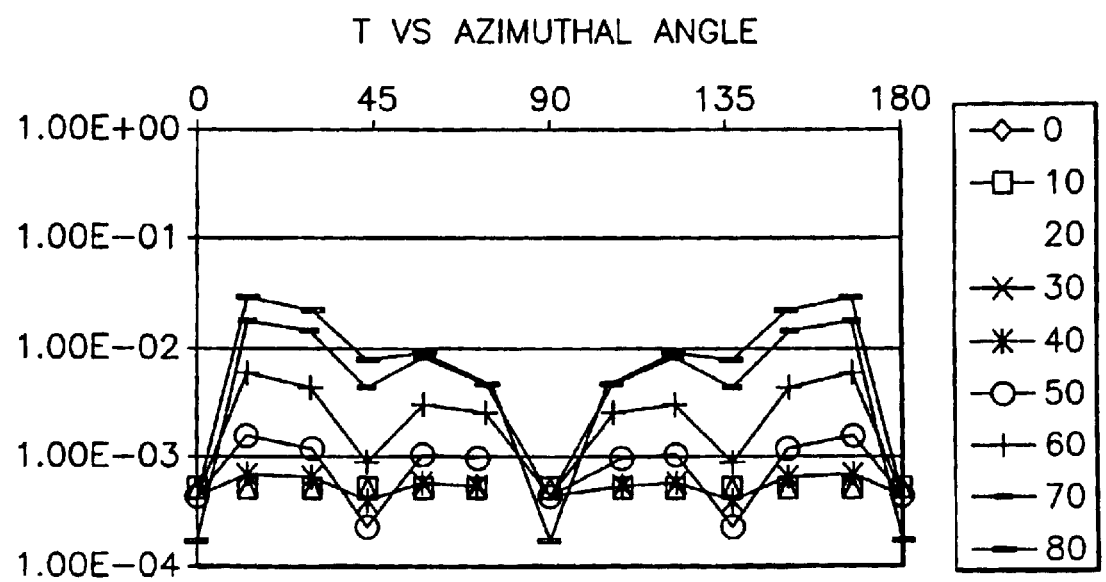

As a first example, a polarization compensator was designed as a combination of an A-plate and C-plate, neither of which will affect the on-axis transmission while reducing the off-axis transmission. The designed compensator, which enhances the performance of crossed wire grid polarizers (wire grid pre-polarizer 230 and wire grid polarization analyzer 270 of FIG. 3), uses a combination of two specific birefringent films, a +275 nm A-plate and a −60 nm C-plate. FIG. 8*d*, which shows the total transmission through the combination of the crossed wire grid polarizers and this first example compensator, shows a broad change in the transmission response curves, indicating significant transmitted light reductions as compared to FIG. 8*a*. The transmission is below $0.48 \times 10^{-3}$ for all polar angles up to 40 deg. (~$0.4 \times 10^{-}$ at 20° polar angle), which is basically equal to the on-axis transmission for the un-compensated crossed wire grid polarizers ($0.4 \times 10^{-3}$). In actuality, the compensator modifies or conditions the polarization orientations of the oblique and skew rays to improve their transmission through the crossed polarizers, thereby enhancing the contrast of the modulated beam. This optimized compensator for wire grid polarizers also provides significantly better performance than does the sheet polarizer compensator discussed previously. Notably, the optical axis of the A-plate for this wire grid polarizer compensator is perpendicular to the transmission axis of the adjacent polarizer. Whereas, by comparison, the prior art sheet polarizer compensator, as described by Chen et al., requires that the optical axis of the A-plate to be parallel to the transmission axis of the adjacent polarizer.

Figure 8E:
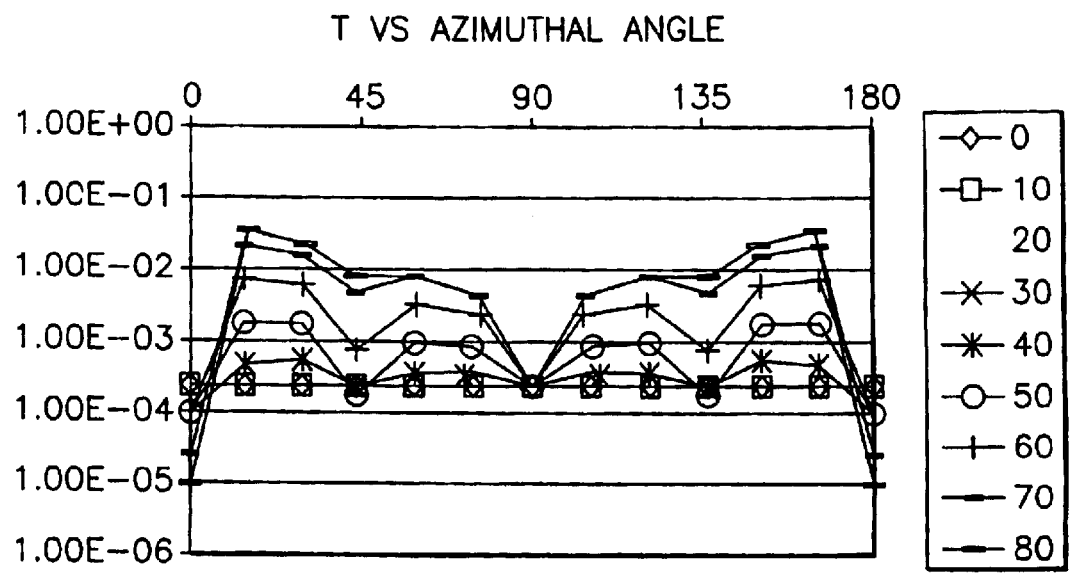

Although, this first example compensator design has significantly improved the performance of a modulation optical system 200 which uses crossed wire grid polarizers, where these wire grid devices have a relatively large pitch (p =144 nm ~λ/4), the same compensator design can improve the performance when wire grid devices with a smaller pitches are used. For example, FIG. 8*e* shows the modeled performance of a fine pitch device (p=5.5 nm ~λ/100) with compensation, where the transmission at a polar angle of 40 deg. and an azimuthal angle of 45 deg. has dropped to $0.24 \times 10^{-3}$ as compared to the prior un-compensated result of $9.7 \times 10^{-3}$ shown in FIG. 8*b*.

Figure 8F:
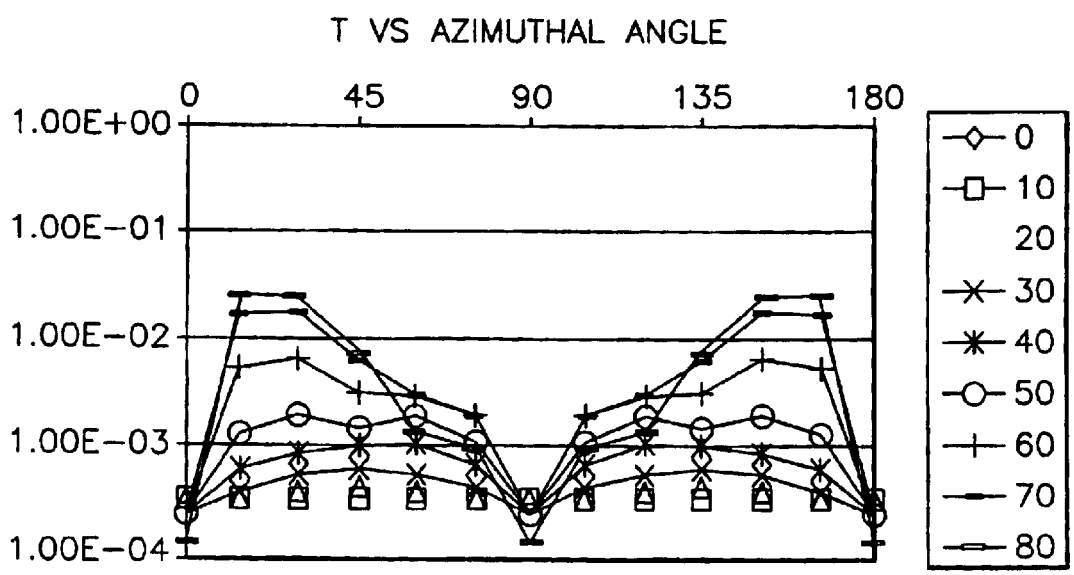

A second example compensator was designed for use with crossed wire grid polarizers, which also has a combination of an A-plate and a C-plate. In this case, the A-plate and C-plate both have positive birefringence, with retardations of 137 nm and 160 nm, respectively. Unlike the first example compensator, the optical axis of the A-plate for this compensator is parallel to the transmission axis of the adjacent polarizer. FIG. 8*f* shows the improved transmission resulting from this compensator design, which is below $0.46 \times 10^{-3}$ for all polar angles up to 20 degrees. However, at a polar angle of 40 deg. and an azimuthal angle of 45 deg. the transmission is only reduced to $1.1 \times 10^{-3}$. While this design is not as good as the first example compensator design, particularly above 20 degree polar angle (see FIG. 8*d*), the light leakage is still significantly reduced as compared to the uncompensated crossed polarizers (see FIG. 8*a*). As before, this compensator can be inserted into a modified the modulation optical system 200 of FIG. 10, as an added element, secondary compensator 265.

Figure 10:
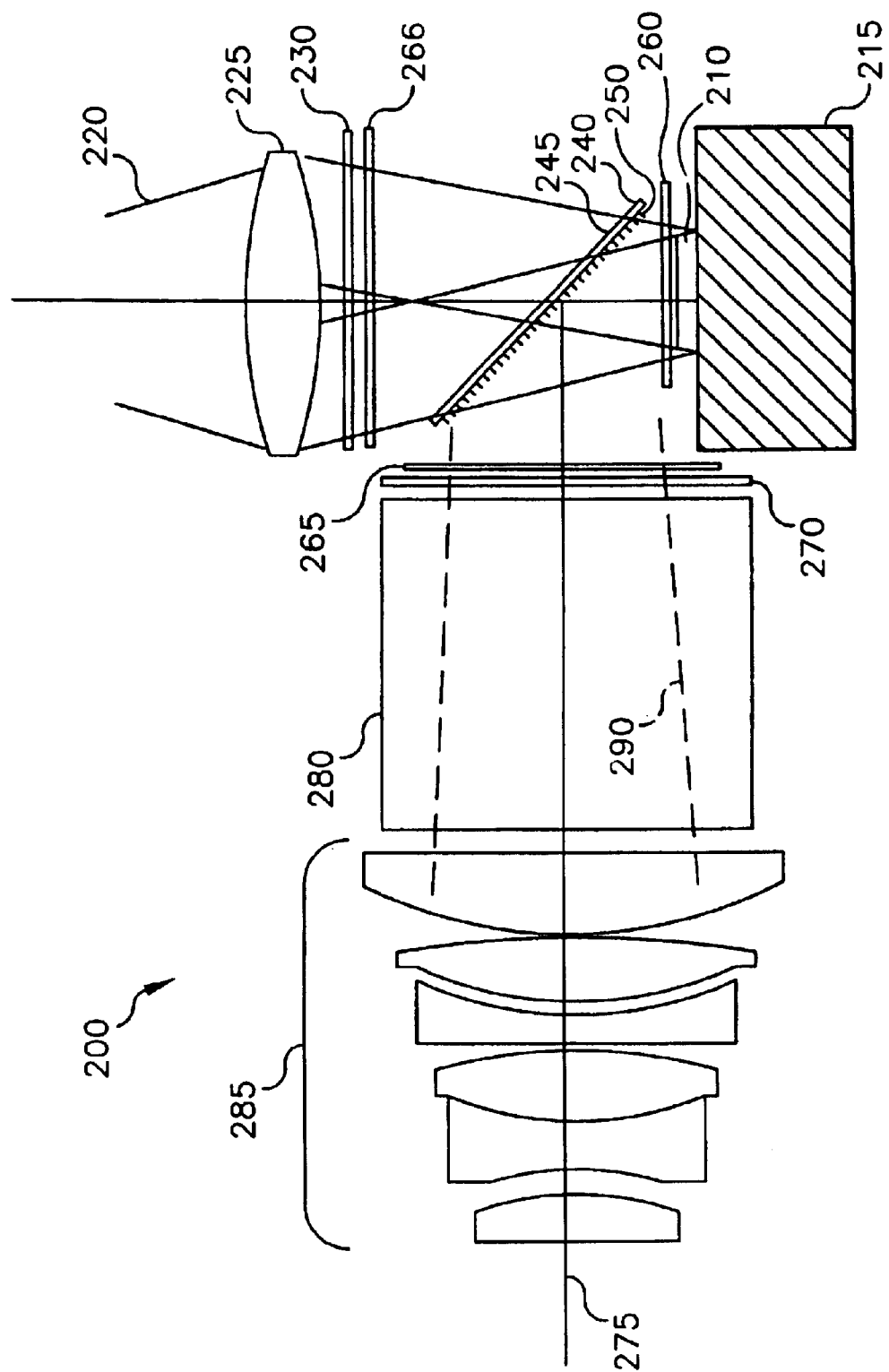
FIG. 10 is a schematic view showing the basic components of a modulation optical system according to the preferred embodiment of the present invention.

In FIG. 10, which shows modified modulation optical system 200, the compensator used to optimize performance through the crossed wire grid polarizers (pre-polarizer 230 and analyzer 270) is located prior to analyzer 270, and is shown as secondary compensator 265. This same compensator could alternately be located just after wire grid pre-polarizer 230, as indicated by alternate secondary compensator 266 of FIG. 10. As another alternative, part of a designed compensator for these crossed polarizers can be positioned as secondary compensator 265, while another portion is simultaneously provided as alternate secondary compensator 266. That is an unlikely scenario, as both the component count and mounting requirements are increased. It is also a requirement that the secondary compensator(s) 265 (and/or 266) be located in the optical path between wire grid pre-polarizer 230 and wire grid polarization analyzer 270. That means that secondary compensator 265 cannot, for example, be located after wire grid polarization analyzer 270.

Figure 5C:
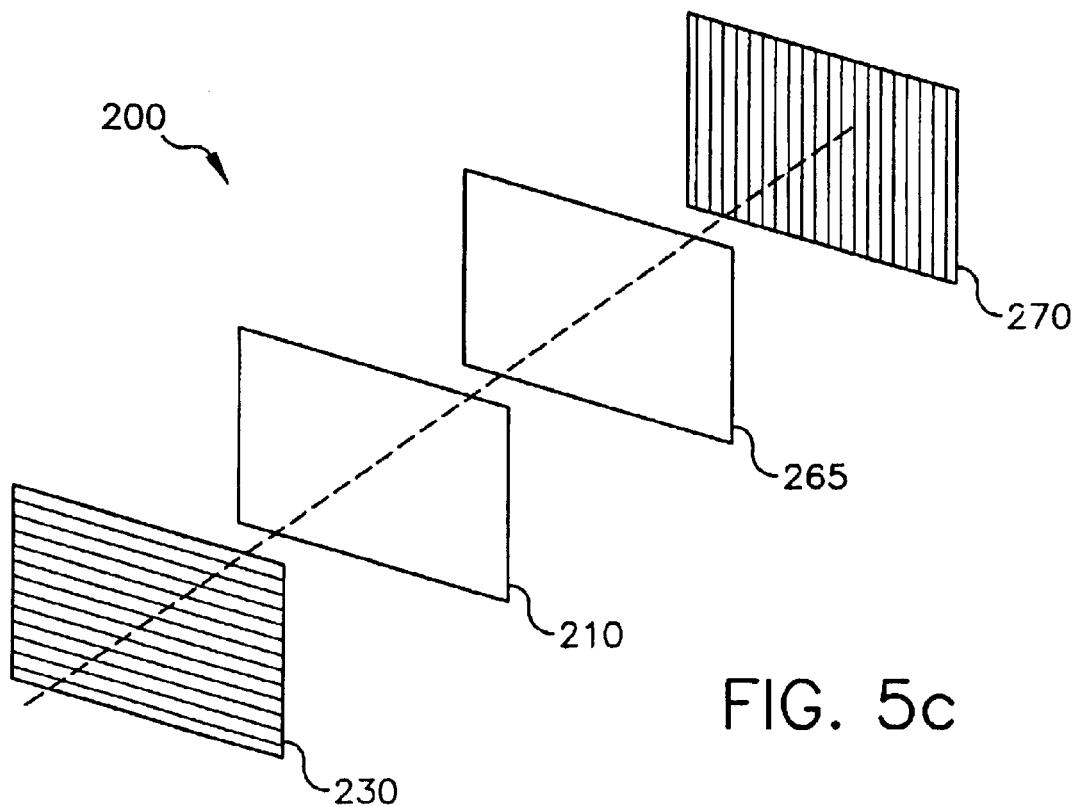
FIG. 5c illustrates the geometry of an unfolded modulation optical system with a transmissive spatial light modulator, wire grid polarizers, and a polarization compensator.

Secondary compensator 265 can also be used in an unfolded optical system without a polarization beamsplitter, as shown in FIG. 5*c*. In this case, transmitted polarized light exits wire grid pre-polarizer 230, passes through a spatial light modulator 210 (which is nominally a transmissive LCD), secondary compensator 265, and wire grid polarization analyzer 270. Alternately, the wire grid polarizer secondary compensator 265 can be located prior to the spatial light modulator 210 within modulation optical system 200. As shown in FIG. 5*c*, the wire grid pre-polarizer 230 and wire grid polarization analyzer 270 are crossed, so that modulation optical system 200 is nominally in the Off state, and spatial light modulator 210 rotates light to transmit through the wire grid polarization analyzer 270 to provide On state light. It should be understood that the wire grid pre-polarizer 230 and wire grid polarization analyzer 270 can be aligned for nominal open state transmission (not crossed), with the spatial light modulator 210 rotating light for the Off state.

Figure 8G:
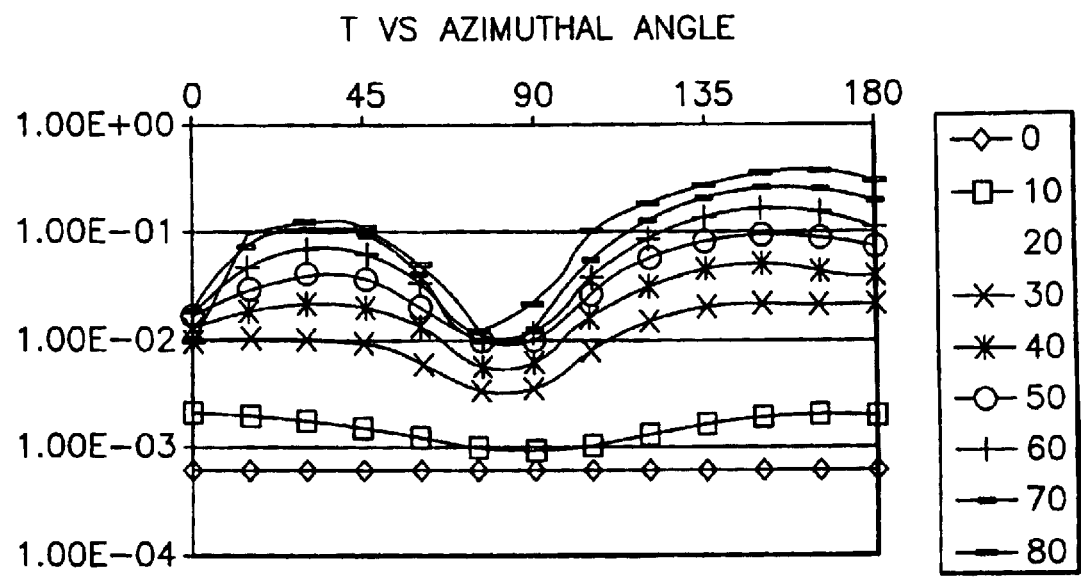

Polarization response improvement can also be provided for the wire grid polarization beamsplitters, as well as for the wire grid polarizers. FIG. 8*g* shows the combined transmission (product of the transmitted light and reflected light) through wire grid polarizing beamsplitters without polarization compensation, assuming that the spatial light modulator 210 is replaced with a perfect mirror. In this case, the incoming beam is incident on 45° tilted surface with a cone described by an azimuthal sweep of 0–180°, and a polar sweep of angles of ~0–40° (see FIG. 5*a*), where the light falls within 0–15° polar angle for an F/2.0 beam. For example, FIG. 8*g* shows a combined transmission without polarization compensation of $6.5 \times 10^{-2}$ at a polar angle of 30° and an azimuthal angle of 45°.

Figure 8H:
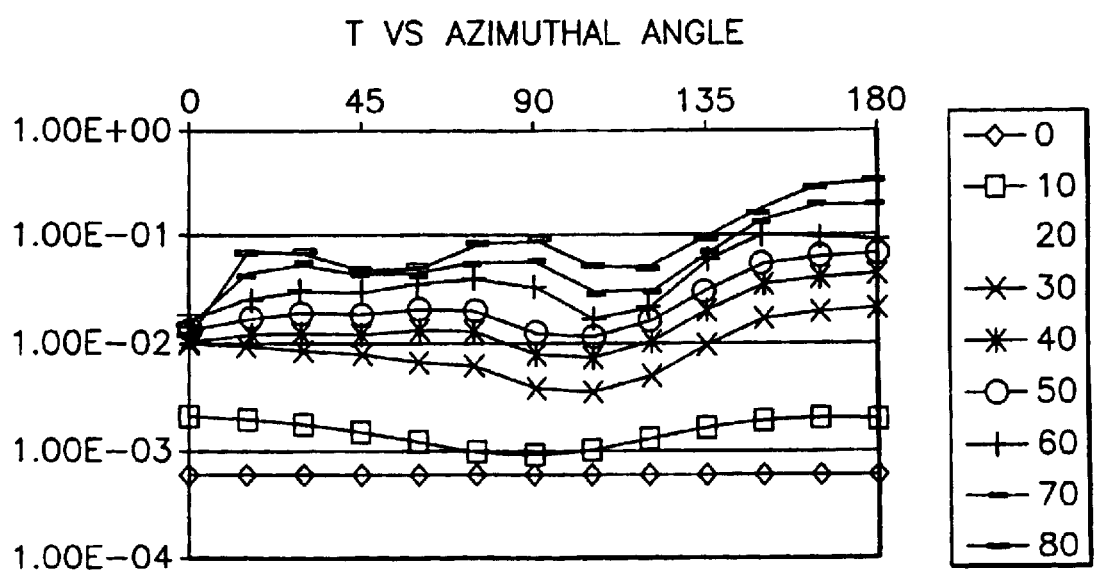

A third example compensator was designed, in this case to enhance the contrast provided by wire grid polarization beamsplitter 240, as used in the modulation optical system 200 of FIG. 10 along with spatial light modulator 210 (VA LCD). This compensator example has a combination of an A-plate and a C-plate, having retardations of 90 nm and 320 nm (both with positive birefringence), respectively. Within the layered structure of the compensator, the A-plate is preferentially located closer to the wire grid polarization beamsplitter than the C-plate, which is closer to the LCD. The optical axis of A-plate is parallel to the transmission axis of the adjacent polarizer (perpendicular to the wires). FIG. 8*h* shows the combined transmission through a wire grid polarizing beamsplitter used in combination with this compensator is reduced to $2.7 \times 10^{-2}$ compared to $6.5 \times 10^{-2}$ at a polar angle of 30 degrees in FIG. 8g. Even at smaller polar angles, such as 15 or 20 degrees, the compensator reduces transmission (less leakage) by ~2×as compared to the un-compensated wire grid polarization beamsplitter. This compensator is shown in the modified modulation optical system 200 of FIG. 10 as compensator 260, and is located between wire grid polarization beamsplitter 240 and liquid crystal spatial light modulator 210. This is the only acceptable location for this compensator within modulation optical system 200.

Figure 8I:
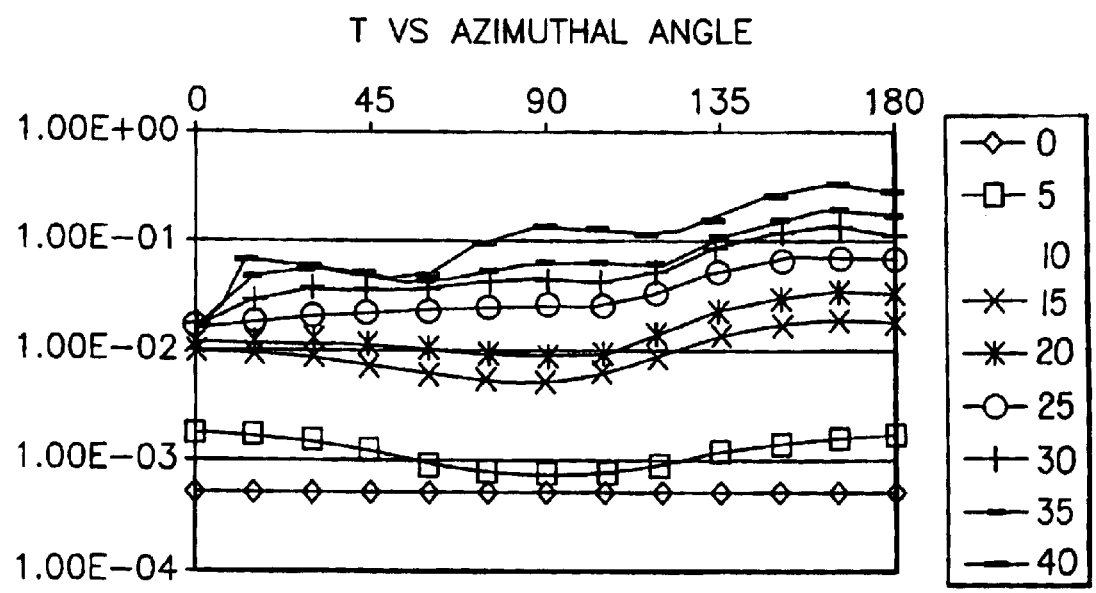

A fourth example compensator was designed, as with the last exemplary device, to enhance the combined transmission provided by wire grid polarization beamsplitter 240 used in the modulation optical system 200 of FIG. 10 along with spatial light modulator 210 (VA LCD). This compensator is a combination of A-plate and C-plate having a retardation of 90 nm and 200 nm, respectively (positive and negative birefringence). The compensator of FIG. 8i provides a smaller combined transmission, which is $3.5 \times 10^{-2}$ compared to $6.5 \times 10^{-2}$ in FIG. 8g. Unlike the third example compensator, the optical axis of the A-plate for this compensator is perpendicular to the transmission axis of the adjacent polarizer (parallel to the wires), rather than parallel to the transmission axis (perpendicular to the wires). As before, this compensator is shown in the modified modulation optical system 200 of FIG. 10 as compensator 260.

It should be emphasized that the prior art does not describe how to design a modulation optical system for a projection display using both LCDs and wire grid devices, which further has polarization compensators to boost contrast. Certainly, the actual exemplary compensators designed for use with the wire grid devices can have conventional structures and combinations of materials (such as polycarbonate or acetate) as have been previously described for other polarization devices. However, wire grid polarizers are distinctly different from the prior art devices (sheet polarizers and MacNeille prisms for example) in subtle and non-obvious ways, and therefore the design of the associated optimized compensators cannot be easily extrapolated from the prior compensator designs.

It is of course understood that various designs can achieve comparable performances as described above or even better. It is also understood that a single biaxial film can be used to replace the combination of A-plate and C-plate for any of these exemplary compensators. It should also be understood that the modeled compensators can be designed in reverse order, with the C-plate encountered before the A-plate, rather than the order of A-plate and then C-plate provided in the above examples. When the order is switched, the designed birefringence values likely change. It is also understood that additional A-plate and/or C-plate and/or biaxial films can be added to the combination of A-plate and C-plate for any of these exemplary compensators.

Certainly, as with the addition of any other optical component into a system, the usual concerns for providing the mounting and AR coatings for these compensators also apply. The compensators may be constructed with their birefringent films sandwiched between two glass substrates, with optical matching adhesives or gels holding the elements together. In that case, any glass to air surfaces should be AR coated. Alternately, the compensators can be integrated with the wire grid polarizers (wire grid pre-polarizer 230 and wire grid polarization analyzer 270) and mounted directly to the glass substrates of these components. That reduces the part count, the count of glass to air surface interactions, and the mounting issues. However, the compensator should be mounted to the flat glass surface of the wire grid device, and not to the surface with the wire grid coating.

Although the above examples are designed for a single wavelength at 550 nm, it should be understood that these examples function for all other wavelengths equally well as for 550 nm provided that the material of the compensator has a dispersion matched with wavelength. This means that ratio of the retardation/wavelength is substantially unchanged across all visible wavelengths.

It should also be understood that modulation optical system 200 can be constructed in a variety of combinations. As depicted in FIG. 10, it includes wire grid pre-polarizer 230, wire grid polarization beamsplitter 240, wire grid polarization analyzer 270, compensator 260, secondary compensator 265, and alternate secondary compensator 266. However the system could be constructed with wire grid pre-polarizer 230, wire grid polarization beamsplitter 240, wire grid polarization analyzer 270, and compensator 260, with the secondary compensators left out. Likewise, the system could be constructed with wire grid polarization beamsplitter 240 and compensator 260, but with wire grid pre-polarizer 230 and wire grid polarization analyzer 270 as non-wire grid devices, and with the secondary compensators left out. Alternately again, the system could be constructed with wire grid pre-polarizer 230, wire grid polarization beamsplitter 240, wire grid polarization analyzer 270, and secondary compensator 265, but with compensator 260 left out. Needless to say, yet other combinations of components are possible.

The overall contrast performance of modulation optical system 200 of FIG. 10 can be enhanced not only be providing compensators which optimize the performance of the crossed wire grid polarizers or the wire grid polarization beamsplitter, but also which enhance the performance of the LCDs as seen through the wire grid polarization beamsplitter. By comparison, in the prior art, U.S. Pat. No. 5,576,854 (Schmidt et al.) a compensator is described which optimizes for the VA LCD working in combination with a MacNeille beamsplitter. As disclosed in U.S. Pat. No. 5,576,854, a $0.27\lambda$ compensator is used, where 0.25 $\lambda$'s compensate for the MacNeille prism and $0.02\lambda$'s for birefringence in the counter electrode substrate. The counter electrode substrate is susceptible to thermal gradients that cause stresses within the substrate, which in turn cause localized birefringence. Even with carefully chosen materials for the substrate glass, such as SF-57 or fused silica, a small retardance, such as $0.02\lambda$'s was used to compensate for residual light leakages in the dark state from stress birefringence. When a vertical aligned LCD is in a non-active state without any voltage applied, the light leakage at on axis is small. However, in practice the dark state is a state with a non-zero voltage called as Voff. This voltage causes the liquid crystal to tilt down, and can significantly increases light leakage. Compensators have also been designed by others for example, U.S. Pat. No. 5,298,199 (Hirose, et al.) to correct for this effect.

In the case of a vertically aligned LCD combined with a wire grid polarizing beamsplitter, the $0.25\lambda$'s retardance used in U.S. Pat. No. 5,576,854 for the MacNeille type prism is not required. However, the residual $0.02\lambda$'s retardance (~11 nm), which is provided as an A-plate, may still be useful to correct to stress birefringence within the VA LCD, even with wire grid devices. In addition, a compensator optimized for a VA LCD may also include a negative C-plate when used in fast optical systems, including a digital cinema system operating at F/3.0 or below. Thus, preferred compensators for reflective VA LCD's used in combination with wire grid polarizers comprise a negative C-plate and a positive A-plate. The negative C-plate is preferred to have same amount of retardation as the liquid crystal (+233 nm for example), but with opposite sign, to correct the viewing angle dependence of the liquid crystal. This viewing angle dependent retardation present in the liquid crystal is typically ~160–250 nm.

Figure 9C:
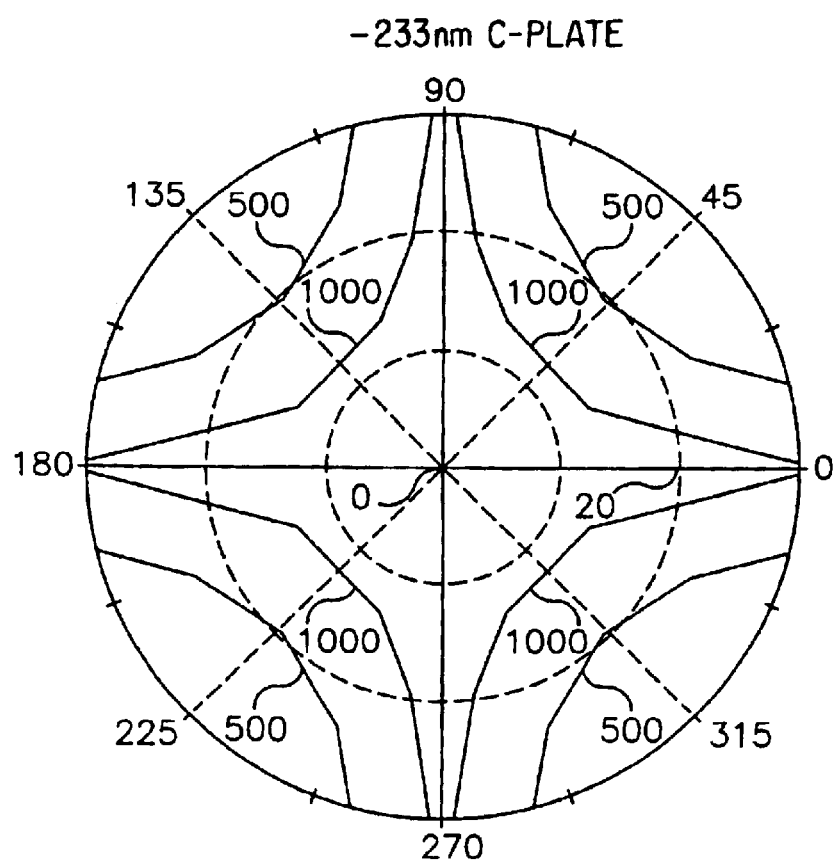
FIG. 9c shows the contrast contour plot for a VA LCD with 10 nm induced retardation from ITO substrate and with proper compensator.
Figure 9A:
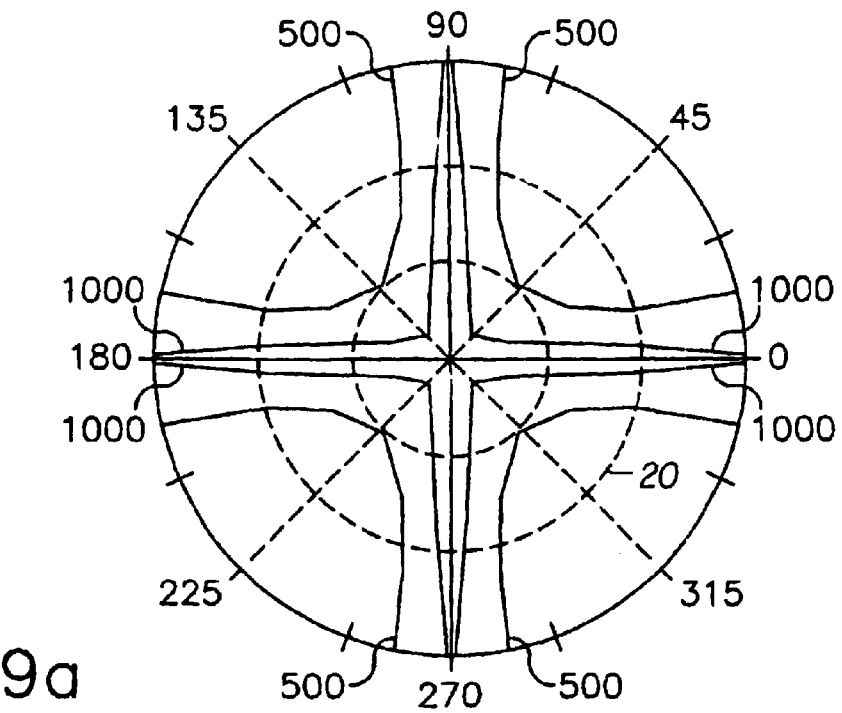
FIG. 9a shows the contrast contour plot for an ideal VA LCD without compensator.
Figure 9B:
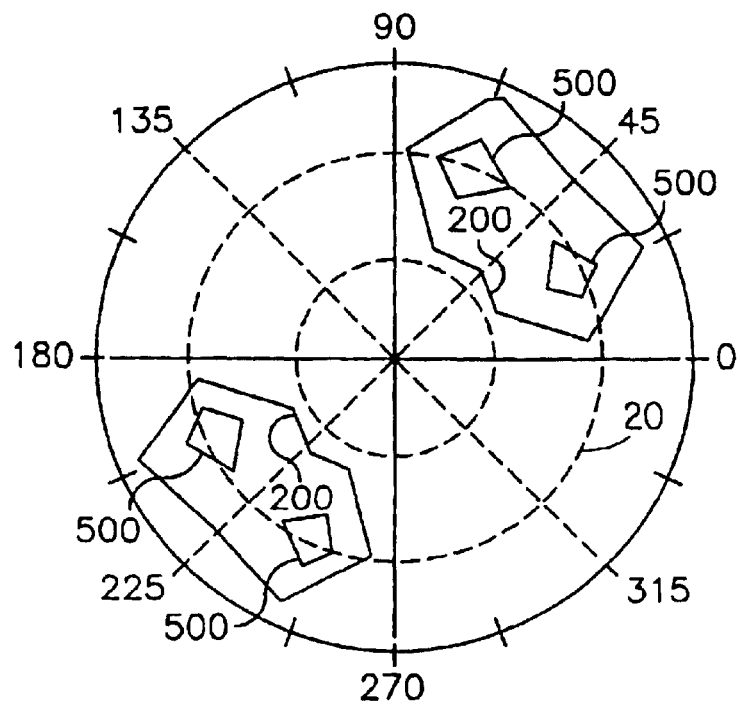
FIG. 9b shows the contrast contour plot for a VA LCD with 10 nm induced retardation from ITO substrate.

As an example, FIG. 9a shows the contrast contour plot for light reflected off of an ideal VA LCD through crossed polarizers in the Off state. This corresponds to the "iron cross" pattern 320 of FIG. 6a, with minimal light along the optical axis (center of the spherical pattern) and along the directions parallel or perpendicular to the transmission axis of the crossed polarizers. However, as the iron cross pattern 320 shows, some leakage light can be expected in the four quadrants. FIG. 9b shows contrast contour plot for light reflected off a VA LCD with 10 nm residual retardation from induced birefringence in the substrate, which corresponds to the baseball pattern 325 of FIG. 6b. Unfortunately, when this baseball pattern 325 occurs, leakage light into the projection system is significantly increased, and the contrast is reduced. FIG. 9c shows contrast contour plot for a VA LCD with proper compensators (−233 nm C-plate) designed according to the present invention inserted at the above discussed locations. The 1000:1 iso-contrast curve extends to more than 13° of polar angle. This compensator can be inserted into modified optical modulation system 200 of FIG. 10, immediately prior to the LCD 210, as compensator 260.

In actuality, the compensators for the wire grid polarization beamsplitter 240 and the LCD 210 are co-located between these two components, and can be combined into one packaged compensator device. The exemplary compensator for the wire grid polarization beamsplitter 240 corresponding to FIG. 8h used a combination of an A-plate and a C-plate having a retardation of 90 nm and 320 nm. By comparison, the vertically aligned LCD has a retardation of ~233 nm, and requires a C-plate with a −233 nm retardation for correction. When these two C-plate designs are combined, the remaining C-plate has only ~87 nm retardance. Thus, the cancellation between the compensator and the LCD significantly decreases the amount of additional retardance needed. The combined compensator 260 then comprises the 11 nm A-plate for the VA LCD (0.02λ's compensation), the 87 nm C-plate, and the 90 nm A-plate for the wire grid polarization beamsplitter 240 in sequential order, with the 11 nm A-plate located closest to the LCD 210. The two A-plates cannot be simply combined, as the 11 nm A-plate needs to be rotatable, while the 90 nm A-plate has a fixed orientation relative to the sub-wavelength wires 250. Thus, what is provided is an apparatus and method for achieving high levels of contrast by using a wire grid polarization beamsplitter with a compensator for minimizing leakage light in the pixel black (OFF) state for a VA LCD.

FIG. 4 shows a graph of the compensated contrast 310 that relates system contrast to the relative F#for a modulation optical system comprising a VA LCD, wire grid polarizers, a wire grid polarization beamsplitter, and a compensator, which correct for the unwanted P polarization in returning modulated beam. In this case, a customized version of compensator 260 is used. Notably, although use of a compensator can actually reduce CR at higher F#values, the compensator improves contrast at low values, below approximately F/4.0. Note that compensated contrast 310 may not always be better, because compensators can be complex structures, which can suffer undesired reflections and defects.

It should be understood that the polarization compensation concepts developed within this application for optimizing the polarization performance of wire grid polarizer devices could be used in modulation optical systems which have spatial light modulators other than vertically aligned LCDs. For example, spatial light modulator 210 could also be a 60 degree twisted nematic LCD, a PLZT modulator, or some other polarization rotating modulator.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention.

PARTS LIST

10. Digital projection apparatus
15. Light source
20. Illumination optics
40. Modulation optical system
45. Pre-polarizer
50. Wire grid polarization beamsplitter
55. Spatial light modulator
60. Polarization analyzer
70. Projection optics
75. Display surface
100. Wire grid polarizer
110. Conductive electrodes or wires
120. Dielectric substrate
130. Beam of light
132. Light Source
140. Reflected light beam
150. Transmitted light beam
200. Modulation optical system
210. Spatial light modulator (LCD)
220. Illumination light beam
225. Condensor
230. Wire grid pre-polarizer
240. Wire grid polarization beamsplitter
245. Dielectric substrate
250. Sub-wavelength wires
260. Compensator
265. Secondary compensator
266. Alternate secondary compensator
270. Wire grid polarization analyzer
275. Optical axis
285. Projection lens
280. Recombination prism
290. Modulated image-bearing light beam
300. System contrast
310. Compensated contrast
320. Iron Cross pattern
325. Baseball pattern
350. Pre-polarized beam
355. Transmitted beam
360. Modulated beam
365. Leakage light
370. Transmitted light
400. Multi-layer compensator
410a. Birefringent layers
410b. Birefringent layers
410c. Birefringent layers
420. Substrate

What is claimed is:

1. A display apparatus comprising:
   (a) a light source for forming a beam of light;
   (b) a pre-polarizer for polarizing said beam of light to provide a polarized beam of light;
   (c) a wire grid polarization beamsplitter for receiving said polarized beam of light, for transmitting said polarized beam of light having a first polarization, and for reflecting said polarized beam of light having a second polarization, wherein sub-wavelength wires on said wire grid polarization beamsplitter face a reflective liquid crystal device;
   (d) wherein said reflective liquid crystal device selectively modulates said polarized beam of light having a first polarization to encode image data thereon in order to form a modulated beam, and then reflects said modulated beam back to said wire grid polarization beamsplitter;
   (e) a compensator, located between said wire grid polarization beamsplitter and said reflective liquid crystal device, for conditioning the polarization states of oblique and skew rays of said modulated beam to provide a compensated modulated beam;
   (f) wherein said wire grid polarization beamsplitter reflects said compensated modulated beam;
   (g) a polarization analyzer which removes residual light of an opposite polarization; and
   (h) image-forming optics for forming an image from said compensated modulated beam.

2. The apparatus of claim 1 wherein said compensator comprises one or more birefringent layers, wherein said birefringent layers comprise at least one of the following; an A-plate film, a C-plate film, or a biaxial film.

3. The A-plate according to claim 2 wherein the optical axis of said A-plate is substantially parallel to said sub-wavelength wires of said wire grid polarization beamsplitter.

4. The A-plate according to claim 2 wherein the optical axis of said A-plate is substantially perpendicular to said sub-wavelength wires of said wire grid polarization beamsplitter.

5. The apparatus of claim 1 wherein said reflective liquid crystal device has a vertically aligned construction.

6. The compensator of claim 1 which modifies polarization states of the oblique and skew rays relative to said wire grid polarization beamsplitter, or said reflective liquid crystal device, or both.

7. A modulation optical system for providing high contrast modulation of an incident light beam, comprising:
   (a) a pre-polarizer for pre-polarizing said beam of light to provide a polarized beam of light;
   (b) a wire grid polarization beamsplitter for receiving said polarized beam of light, for transmitting said polarized beam of light having a first polarization, and for reflecting said polarized beam of light having a second polarization, wherein sub-wavelength wires on said wire grid polarization beamsplitter face a reflective liquid crystal device;
   (c) wherein said reflective liquid crystal device selectively modulates said polarized beam of light having a first polarization to encode image data thereon in order to form a modulated beam, and then reflects said modulated beam back to said wire grid polarization beamsplitter;
   (d) a compensator, located between said wire grid polarization beamsplitter and said reflective liquid crystal device, for conditioning the polarization states of oblique and skew rays of said modulated beam to provide a compensated modulated beam;
   (e) a polarization analyzer which removes residual light of the opposite polarization.

8. The system of claim 7 wherein said compensator comprises one or more birefringent layers, wherein said birefringent layers comprise at least one of the following; an A-plate film, a C-plate film, or a biaxial film.

9. The A-plate according to claim 8 wherein the optical axis of said A-plate is substantially parallel to said sub-wavelength wires of said wire grid polarization beam splitter.

10. The A-plate according to claim 8 wherein the optical axis of said A-plate is substantially perpendicular to said sub-wavelength wires of said wire grid polarization beamsplitter.

11. The system of claim 7 wherein said reflective liquid crystal device has a vertically aligned construction.

12. The compensator of claim 7 which modifies polarization states of the oblique and skew rays relative to said wire grid polarization beamsplitter, or said reflective liquid crystal device, or both.

13. A modulation optical system for providing high contrast modulation of an incident light beam, comprising:
   (a) a wire grid pre-polarizer for pre-polarizing said beam of light;
   (b) a wire grid polarization beamsplitter for receiving said polarized beam of light, for transmitting said polarized beam of light having a first polarization, and for reflecting said polarized beam of light having a second polarization, wherein sub-wavelength wires on said wire and polarization beamsplitter face a reflective liquid crystal device;
   (c) wherein said reflective liquid crystal device selectively modulates said polarized beam of light having a first polarization to encode image data thereon in order to form a modulated beam, and then reflects said modulated beam back to said wire grid polarization beamsplitter;
   (d) a compensator, located between said wire grid polarization beamsplitter and said reflective liquid crystal device, for conditioning the polarization states of oblique and skew rays of said modulated beam to provide a compensated modulated beam; and
   (e) a wire grid polarization analyzer which removes residual light of the opposite polarization.

14. The system of claim 13 wherein said compensator comprises one or more birefringent layers, wherein said birefringent layers comprise at least one of the following; an A-plate film, a C-plate film, or a biaxial film.

15. The A-plate according to claim 14 wherein the optical axis of said A-plate is substantially parallel to said sub-wavelength wires of said wire grid polarization beamsplitter.

16. The A-plate according to claim 14 wherein the optical axis of said A-plate is substantially perpendicular to said sub-wavelength wires of said wire grid polarization beamsplitter.

17. The system of claim 13 wherein said reflective liquid crystal device has a vertically aligned construction.

18. The compensator of claim 13 which modifies polarization states of the oblique and skew rays relative to said wire grid polarization beamsplitter, or said reflective liquid crystal device, or both.

19. A modulation optical system for providing high contrast modulation of an incident light beam, comprising:

(a) a wire grid pre-polarizer for pre-polarizing said beam of light;

(b) a wire grid polarization beamsplitter for receiving said polarized beam of light, for transmitting said polarized beam of light having a first polarization, and for reflecting said polarized beam of light having a second polarization, wherein sub-wavelength wires on said wire grid polarization beamsplitter face a reflective liquid crystal device;

(c) wherein said reflective liquid crystal device selectively modulates said polarized beam of light having a first polarization to encode image data thereon in order to form a modulated beam, and then reflects said modulated beam back to said wire grid polarization beamsplitter;

(d) a wire grid polarization analyzer which removes unmodulated first polarization light; and (e) a compensator which conditions the polarization states of oblique and skew rays relative to said wire-grid polarization analyzer and said wire grid pre-polarizer.

20. The system of claim 19 wherein said compensator comprises one or more birefringent layers, wherein said birefringent layers comprise at least one of the following; an A-plate film, a C-plate film, or a biaxial film.

21. The A-plate according to claim 20 wherein the optical axis of said A-plate is substantially parallel to said sub-wavelength wires of said wire grid polarization analyzer.

22. The A-plate according to claim 20 wherein the optical axis of said A-plate is substantially perpendicular to said sub-wavelength wires of said wire grid polarization analyzer.

23. The system of claim 19 wherein said reflective liquid crystal device has a vertically aligned construction.

24. The system of claim 19 wherein said compensator is located between said wire grid pre-polarizer and said wire grid polarization beamsplitter.

25. The system of claim 19 wherein said compensator is located between said wire grid polarization beamsplitter and said wire grid polarization analyzer.

26. A display apparatus comprising:

(a) a light source for forming a beam of light;

(b) a wire grid pre-polarizer for polarizing said beam of light to provide a polarized beam of light;

(c) a wire grid polarization beamsplitter for receiving said polarized beam of light, for transmitting said polarized beam of light having a first polarization, and for reflecting said polarized beam of light having a second polarization, wherein sub-wavelength wires on said wire grid polarization beamsplitter face a reflective liquid crystal device;

(d) wherein said reflective liquid crystal device selectively modulates said polarized beam of light having a first polarization to encode image data thereon in order to form a modulated beam, and then reflects said modulated beam back to said wire grid polarization beamsplitter;

(e) a compensator, located between said wire grid polarization beamsplitter and said reflective liquid crystal device, for conditioning the polarization states of oblique and skew rays of said modulated beam to provide a compensated modulated beam;

(f) a wire grid polarization analyzer which removes residual light of the opposite polarization; and (g) image-forming optics for forming an image from said compensated modulated beam.

27. The system of claim 26 wherein said compensator comprises one or more birefringent layers, wherein said birefringent layers comprise at least one of the following; an A-plate film, a C-plate film, or a biaxial film.

28. The A-plate according to claim 27 wherein the optical axis of said A-plate is substantially parallel to said sub-wavelength wires of said wire grid polarization beamsplitter.

29. The A-plate according to claim 27 wherein the optical axis of said A-plate is substantially perpendicular to said sub-wavelength wires of said wire grid polarization beamsplitter.

30. The system of claim 26 wherein said reflective liquid crystal device has a vertically aligned construction.

31. The compensator of claim 26 which modifies polarization states of the oblique and skew rays relative to said wire grid polarization beamsplitter, or said reflective liquid crystal device, or both.

32. A method for projecting an image generated from image data, the method comprising:

(a) creating a polarized light beam;

(b) directing said polarized light beam to a wire grid polarization beamsplitter, transmitting incident light having a first polarization as a transmitted beam, and reflecting incident light having a second polarization as a reflected beam;

(c) modulating said transmitted beam from said wire grid polarization beamsplitter to encode image data at a reflective liquid crystal device and to provide a modulated beam;

(d) disposing a compensator in the path of said modulated beam to alter polarization states of oblique and skew light rays and thereby enhance the removal of leakage light from said modulated beam; and (e) projecting said modulated beam to form said image.

33. A display apparatus comprising:

(a) a light source for forming a beam of light;

(b) a wire grid pre-polarizer for polarizing said beam of light to provide a polarized beam of light;

(c) a wire grid polarization beamsplitter for receiving said polarized beam of light, for transmitting said polarized beam of light having a first polarization, and for reflecting said polarized beam of light having a second polarization, wherein sub-wavelength wires on said wire grid polarization beamsplitter face a reflective liquid crystal device;

(d) wherein said reflective liquid crystal device selectively modulates said polarized beam of light having a first polarization to encode image data thereon in order to form a modulated beam, and then reflects said modulated beam back to said wire grid polarization beamsplitter;

(e) a wire grid polarization analyzer which removes residual light of the opposite polarization;

(f) a compensator for conditioning the polarization states of oblique and skew rays from said wire grid pre-polarizer and said wire grid polarization analyzer; and (g) image-forming optics for forming an image from said modulated beam.

34. The apparatus of claim 33 wherein said compensator comprises one or more birefringent layers, wherein said birefringent layers comprise at least one of the following; an A-plate film, a C-plate film, or a biaxial film.

35. The A-plate according to claim 34 wherein the optical axis of said A-plate is substantially parallel to said sub-wavelength wires of said wire grid polarization beamsplitter.

36. The A-plate according to claim 34 wherein the optical axis of said A-plate is substantially perpendicular to said sub-wavelength wires of said wire grid polarization beamsplitter.

37. The apparatus of claim 33 wherein said reflective liquid crystal device has a vertically aligned construction.

38. The apparatus of claim 33 wherein said compensator is located between said wire grid pre-polarizer and said wire grid polarization beamsplitter.

39. The apparatus of claim 33 wherein said compensator is located between said wire grid polarization beamsplitter and said wire grid polarization analyzer.

40. A display apparatus comprising:
(a) a light source for forming a beam of light;
(b) a pre-polarizer for polarizing said beam of light to provide a polarized beam of light;
(c) a wire grid polarization beamsplitter for receiving said polarized beam of light, for transmitting said polarized beam of light having a first polarization, and for reflecting said polarized beam of light having a second polarization, wherein sub-wavelength wires on said wire mid polarization beamsplitter face a reflective liquid crystal device;
(d) wherein said reflective liquid crystal device selectively modulates said polarized beam of light having a first polarization to encode image data thereon in order to form a modulated beam, and then reflects said modulated beam back to said wire grid polarization beamsplitter;
(e) a wire grid polarization analyzer which removes residual light of the opposite polarization;
(f) image-forming optics for forming an image from said modulated beam; and
(g) a compensator, located between said wire grid polarization beamsplitter and said reflective liquid crystal device for conditioning the polarization states of oblique and skew rays of said modulated beam.

41. A display apparatus comprising:
(a) a light source for forming a beam of light;
(b) a pre-polarizer for polarizing said beam of light to provide a polarized beam of light;
(c) a wire grid polarization beamsplitter for receiving said polarized beam of light, for transmitting said polarized beam of light having a first polarization, and for reflecting said polarized beam of light having a second polarization, wherein sub-wavelength wires on said wire grid notarization beamsplitter face a reflective spatial light modulator;
(d) wherein said reflective spatial light modulator selectively modulates said polarized beam of light having a first polarization to encode image data thereon in order to form a modulated beam, and then reflects said modulated beam back to said wire grid polarization beamsplitter;
(e) a compensator, located between said wire grid polarization beamsplitter and said reflective spatial light modulator, for conditioning the polarization states of oblique and skew rays of said modulated beam to provide a compensated modulated beam;
(f) wherein said wire grid polarization beamsplitter reflects said compensated modulated beam;
(g) a polarization analyzer which removes residual light of the opposite polarization; and
(h) image-forming optics for forming an image from said compensated modulated beam.

42. A modulation optical system for providing contrast modulation of an incident light beam, comprising:
(a) polarization optics including at least two wire grid polarization devices, where at least one of said wire grid polarization devices is a wire grid polarization beamsplitter, and said incident beam of light interacts with said wired grid polarization beamsplitter with a portion reflected and another portion transmitted;
(b) a reflective liquid crystal device for selectively modulating a beam of light having to encode image data thereon in order to form a modulated beam, where said reflective liquid crystal device alters a polarization state of said beam of light in a controlled manner with said image data and reflects said modulated beam back to said wire grid polarization beamsplitter;
(c) a compensator, located between said wire grid polarization beamsplitter and said reflective liquid crystal device, for conditioning the polarization states of oblique and skew rays of said modulated beam; and
wherein the sub-wavelength wires on said wire grid polarization beamsplitter face said reflective liquid crystal device.

43. The system of claim 42 wherein said compensator comprises one or more birefringent layers, wherein said birefringent layers comprise at least one of the following; an A-plate film, a C-plate film, or a biaxial film.

44. The A-plate according to claim 43 wherein the optical axis of said A-plate is substantially parallel to the sub-wavelength wires of said wire grid polarization beamsplitter.

45. The A-plate according to claim 43 wherein the optical axis of said A-plate is substantially perpendicular to the sub-wavelength wires of said wire grid polarization beamsplitter.

46. The modulation optical system of claim 42 wherein said reflective liquid crystal device has a vertically aligned construction.

47. The compensator of claim 42 which modifies polarization states of the oblique and skew rays relative to said wire grid polarization beamsplitter, or said reflective liquid crystal device, or both.

48. An electronic projection apparatus for projection of color images onto a display surface, said apparatus comprising:
(a) a light source which produces a beam of light;
(b) an optical system which separates said beam of light into separate color beams of light, and which provides beam shaping and focusing of said color beams of light;
(c) a modulation optical system for each of said color beams of light, said modulation optical system providing an image bearing color light beam, and said modulation optical system comprising:
(1) a prepolarizer for prepolarizing one of said colored beams of light to provide a polarized beam of light
(2) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective liquid crystal device;
(3) wherein said reflective liquid crystal device receives said polarized beam of light, having either a first polarization or a second polarization, and selectively modulates said polarized beam of light to encode image data thereon, providing both modulated light and unmodulated light which differ in polarization;

(4) wherein said reflective liquid crystal device reflects back both said modulated light and said unmodulated light to said wire grid polarization beamsplitter;

(5) wherein a polarization compensator, located between said wire grid polarization beamsplitter and said reflective liquid crystal device, is provided for conditioning oblique and skew light rays;

(6) wherein said wire grid polarization beamsplitter separates said modulated light from said unmodulated light;

(7) wherein a polarization analyzer receives said modulated light, and which further removes any residual unmodulated light from said modulated light;

(d) a recombination prism for combining said image bearing color light beams corresponding to each of said color beams of light, into a full color image bearing beam; and (e) a projection lens system for projecting said full color image bearing beam onto said display surface; and wherein said pre-polarizer and said polarization analyzer in any of said modulation optical systems corresponding to a given color have different polarization properties from one another.

49. An electronic projection apparatus according to claim 48 wherein said pre-polarizer is a MacNielle type prism and said polarization analyzer is a wire grid polarizer.

50. An electronic projection apparatus according to claim 48 wherein said pre-polarizer and said polarization analyzer are both wire grid polarizers.

51. An electronic projection apparatus as in claim 48 wherein said reflective liquid crystal device receives said polarized beam of light having a first polarization, as was transmitted through said wire grid polarization beamsplitter.

52. An electronic projection apparatus as in claim 48 wherein said reflective liquid crystal device receives said polarized beam of light having a second polarization, as was reflected from said wire grid polarization beamsplitter.

53. An electronic projection apparatus for projection of color images onto a display surface, said apparatus comprising:

(a) a light source which produces a beam of light;

(b) an optical system which separates said beam of light into separate color beams of light, and which provides beam shaping and focusing of said color beams of light;

(c) a modulation optical system for each of said color beams of light, said modulation optical system providing an image bearing color light beam, and said modulation optical system comprising:

(1) a prepolarizer for prepolarizing one of said colored beams of light to provide a polarized beam of light (2) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;

(3) wherein said reflective spatial light modulator receives said polarized beam of light, having either a first polarization or a second polarization, and selectively modulates said polarized beam of light to encode image data thereon, providing both modulated light and unmodulated light which differ in polarization;

(4) wherein said reflective spatial light modulator reflects back both said modulated light and said unmodulated light to said wire grid polarization beamsplitter;

(5) wherein said wire grid polarization beamsplitter separates said modulated light from said unmodulated light;

(6) wherein a compensator, located between said wire grid polarization beamsplitter and said reflective spatial light modulator, is provided for conditioning the polarization states of oblique and skew light rays;

(7) wherein a polarization analyzer receives said modulated light, and which further removes any residual unmodulated light from said modulated light;

(d) a recombination prism for combining said image bearing color light beams corresponding to each of said color beams of light, into a full color image bearing beam;

(e) a projection lens system for projecting said full color image bearing beam onto said display surface; and wherein said pre-polarizer and said polarization analyzer in any of said modulation optical systems corresponding to a given color have different polarization properties from one another.

54. An electronic projection apparatus according to claim 53 wherein said pre-polarizer is a MacNielle type prism and said polarization analyzer is a wire grid polarizer.

55. An electronic projection apparatus according to claim 53 wherein said pre-polarizer and said polarization analyzer are both wire grid polarizers.

56. An electronic projection apparatus as in claim 53 wherein said reflective spatial light modulator receives said polarized beam of light having a first polarization, as was transmitted through said wire grid polarization beamsplitter.

57. An electronic projection apparatus as in claim 53 wherein said reflective spatial light modulator receives said polarized beam of light having a second polarization, as was reflected from said wire grid polarization beamsplitter.

58. A modulation optical system for providing modulation of an incident light beam comprising:

(a) a prepolarizer for pre-polarizing said beam of light to provide a polarized beam of light;

(b) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;

(c) wherein said reflective spatial light modulator receives said polarized beam of light, having either a first polarization or a second polarization, and selectively modulates said polarized beam of light to encode data thereon, providing both modulated light and unmodulated light which differ in polarization;

(d) wherein said reflective spatial light modulator reflects back both said modulated light and said unmodulated light to said wire grid polarization beamsplitter;

(e) wherein a polarization compensator, located between said wire grid polarization beamsplitter and said reflective liquid crystal device, is provided for conditioning oblique and skew light rays;

(f) wherein said wire grid polarization beamsplitter separates said modulated light from said unmodulated light;

(g) a polarization analyzer receives said modulated light, and which further removes any residual unmodulated light from said modulated light; and wherein said pre-polarizer and said polarization analyzer in said modulation optical system have different polarization properties from one another.

59. A modulation optical system according to claim 58 wherein said pre-polarizer is a MacNielle type prism and said polarization analyzer is a wire grid polarizer.

60. A modulation optical system according to claim 58 wherein said pre-polarizer and said polarization analyzer are both wire grid polarizers.

61. A modulation optical system as in claim 58 wherein said reflective spatial light modulator receives said polarized beam of light having a first polarization, as was transmitted through said wire grid polarization beamsplitter.

62. A modulation optical system as in claim 58 wherein said reflective spatial light modulator receives said polarized beam of light having a second polarization, as was reflected from said wire grid polarization beamsplitter.

63. A modulation optical system for providing modulation of an incident light beam comprising:
  (a) a prepolarizer for pre-polarizing said beam of light to provide a polarized beam of light;
  (b) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;
  (c) wherein said reflective spatial light modulator receives said polarized beam of light, having either a first polarization or a second polarization, and selectively modulates said polarized beam of light to encode data thereon, providing both modulated light and unmodulated light which differ in polarization;
  (d) wherein said reflective spatial light modulator reflects back both said modulated light and said unmodulated light to said wire grid polarization beamsplitter;
  (e) wherein said wire grid polarization beamsplitter separates said modulated light from said unmodulated light;
  (f) a polarization analyzer receives said modulated light, and which further removes any residual unmodulated light from said modulated light; and
  wherein said pre-polarizer and said polarization analyzer in said modulation optical system have different polarization properties from one another.

64. A modulation optical system according to claim 63 wherein said pre-polarizer is a MacNielle type prism and said polarization analyzer is a wire grid polarizer.

65. A modulation optical system according to claim 63 wherein said pre-polarizer and said polarization analyzer are both wire grid polarizers.

66. A modulation optical system as in claim 63 wherein said reflective spatial light modulator receives said polarized beam of light having a first polarization, as was transmitted through said wire grid polarization beamsplitter.

67. A modulation optical system as in claim 63 wherein said reflective spatial light modulator receives said polarized beam of light having a second polarization, as was reflected from said wire grid polarization beamsplitter.

68. A modulation optical system for providing modulation of an incident beam of light comprising:
  (a) a wire grid polarization beamsplitter for receiving said beam of light and providing a polarized beam of light, by nominally transmitting the portion of said beam of light having a first polarization, and for nominally reflecting the portion of said beam of light having a second polarization orthogonal to said first polarization, wherein subwavelength wires on said wire grid polarization beamsplitter face a reflective spatial light modulator
  (b) wherein said reflective spatial light modulator receives said polarized beam of light, having either a first polarization or a second polarization, and then selectively modulates said polarized beam of light to encode data thereon, providing both modulated light and unmodulated light which differ in polarization;
  (c) wherein said reflective spatial light modulator reflects back both said modulated light and said unmodulated light to said wire grid polarization beamsplitter;
  (d) wherein said wire grid polarization beamsplitter separates said modulated light from said unmodulated light; and
  (e) wherein said modulation optical system further comprises at least a second wire grid polarizer, which is either a pre-polarizer that interacts with said incident beam of light prior to said wire grid polarization beamsplitter, or is a polarization analyzer that follows said wire grid polarization beamsplitter, and receives said modulated light, and further removes any residual unmodulated light from said modulated light.

69. A modulation optical system as in claim 68 wherein said modulator is a liquid crystal display device.

70. A modulation optical system as in claim 68 wherein said liquid crystal display device is comprised of vertically aligned liquid crystal molecules.

71. A modulation optical system as in claim 68 wherein said reflective spatial light modulator receives said polarized beam of light having a first polarization, as was transmitted through said wire grid polarization beamsplitter.

72. A modulation optical system as in claim 68 wherein said reflective spatial light modulator receives said polarized beam of light having a second polarization, as was reflected from said wire grid polarization beamsplitter.

73. A modulation optical system for providing high contrast modulation of an incident light beam comprising:
  (a) a prepolarizer for pre-polarizing said beam of light to provide a polarized beam of light;
  (b) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;
  (c) wherein said reflective spatial light modulator receives said polarized beam of light, having either a first polarization or a second polarization, and selectively modulates said polarized beam of light to encode data thereon, providing both modulated light and unmodulated light which differ in polarization;
  (d) wherein said reflective spatial light modulator reflects back both said modulated light and said unmodulated light to said wire grid polarization beamsplitter;
  (e) wherein a polarization compensator, located between said wire grid polarization beamsplitter and said reflective liquid crystal spatial light modulator, is provided for conditioning oblique and skew light rays relative to said wire and polarization beamsplitter, or said reflective spatial light modulator, or both;
  (f) wherein said wire grid polarization beamsplitter separates said modulated light from said unmodulated light; and (g) a polarization analyzer receives said modulated light, and which further removes any residual unmodulated light from said modulated light.

74. A modulation optical system as in claim 73 wherein said reflective spatial light modulator is a liquid crystal display device is comprised of vertically aligned liquid crystal molecules.

75. A modulation optical system as in claim 73 wherein said prepolarizer comprises a wire grid polarizer.

76. A modulation optical system as in claim 73 wherein said polarization analyzer comprises a wire grid polarizer.

77. A modulation optical system as in claim 73 wherein said reflective spatial light modulator receives said polarized beam of light having a first polarization, as was transmitted through said wire grid polarization beamsplitter.

78. A modulation optical system as in claim 73 wherein said reflective spatial light modulator receives said polarized beam of light having a second polarization, as was reflected from said wire grid polarization beamsplitter.

79. A modulation optical system for providing contrast modulation of an incident light beam comprising:

(a) a wire grid polarization beamsplitter for receiving said incident beam of light, for transmitting a portion of said incident beam of light having a first polarization, and for reflecting a portion of said incident beam of light having a second polarization nominally orthogonal to said first polarization, wherein subwavelength wires on said wire grid polarization beamsplitter face a reflective spatial light modulator;

(b) wherein said reflective spatial light modulator receives a beam of light, having either a first polarization or a second polarization, and selectively modulates said polarized beam of light to encode data thereon, providing both modulated light and unmodulated light which differ in polarization;

(c) wherein said reflective spatial light modulator reflects back both said modulated light and said unmodulated light to said wire grid polarization beamsplitter;

(d) wherein a polarization compensator, located between said wire grid polarization beamsplitter and said reflective spatial light modulator, is provided for conditioning oblique and skew light rays relative to said wire grid polarization beamsplitter, or said reflective spatial light modulator, or both; and (e) wherein said wire grid polarization beamsplitter separates said modulated light from said unmodulated light.

80. A modulation optical system for providing contrast modulation of an incident light beam comprising:

(a) a prepolarizer for pre-polarizing said beam of light to provide a polarized beam of light;

(b) a wire grid polarization beamsplitter for receiving said polarized beam of light, for transmitting said polarized beam of light having a first polarization, and for reflecting said polarized beam of light having a second polarization orthogonal to said first polarization, wherein subwavelength wires on said wire grid polarization beamsplitter face a reflective spatial light modulator;

(c) wherein said reflective spatial light modulator receives said polarized beam of light, having either a first polarization or a second polarization, and selectively modulates said polarized beam of light to encode data thereon, providing both modulated light and unmodulated light which differ in polarization;

(d) wherein said reflective spatial light modulator reflects back both said modulated light and said unmodulated light to said wire grid polarization beamsplitter;

(e) wherein a polarization compensator, provided adjacent to said wire grid polarization beamsplitter, conditions the oblique and skew light rays relative to said wire grid polarization beamsplitter, or said reflective spatial light modulator, or both; and;

(f) wherein said wire grid polarization beamsplitter separates said modulated light from said unmodulated light; and (g) a polarization analyzer receives said modulated light, and which further removes any residual unmodulated light from said modulated light.

81. A modulation optical system for providing contrast modulation of an incident light beam comprising:

(a) a prepolarizer for pre-polarizing said beam of light to provide a polarized beam of light;

(b) a wire grid polarization beamsplitter for receiving said polarized beam of light, for transmitting said polarized beam of light having a first polarization, and for reflecting said polarized beam of light having a second polarization orthogonal to said first polarization;

(c) a reflective spatial light modulator receives said polarized beam of light, having either a first polarization or a second polarization, and selectively modulates said polarized beam of light to encode data thereon, providing both modulated light and unmodulated light which differ in polarization;

(d) wherein said reflective spatial light modulator reflects back both said modulated light and said unmodulated light to said wire grid polarization beamsplitter;

(e) wherein a polarization compensator, located between said wire grid polarization beamsplitter and said reflective spatial light modulator, conditions the oblique and skew light rays relative to said wire grid polarization beamsplitter, or said reflective spatial light modulator, or both; and;

(f) wherein said wire grid polarization beamsplitter separates said modulated light from said unmodulated light; and (g) a polarization analyzer receives said modulated light, and which further removes any residual unmodulated light from said modulated light.

82. A modulation optical system for providing contrast modulation of an incident light beam comprising:

(a) a prepolarizer for pre-polarizing said beam of light to provide a polarized beam of light;

(b) a wire grid polarization beamsplitter for receiving said polarized beam of light, for transmitting said polarized beam of light having a first polarization, and for reflecting said polarized beam of light having a second polarization orthogonal to said first polarization;

(c) a reflective spatial light modulator receives said polarized beam of light, having either a first polarization or a second polarization, and selectively modulates said polarized beam of light to encode data thereon, providing both modulated light and unmodulated light which differ in polarization;

(d) wherein said reflective spatial light modulator reflects back both said modulated light and said unmodulated light to said wire grid polarization beamsplitter;

(e) wherein a polarization compensator, located in the portion of the optical path that includes said wire grid polarization beamsplitter and said reflective spatial light modulator, conditions the oblique and skew light rays relative to said wire grid polarization beamsplitter, or said reflective spatial light modulator, or both;

(f) wherein said wire grid polarization beamsplitter separates said modulated light from said unmodulated light; and (g) a polarization analyzer receives said modulated light, and which further removes any residual unmodulated light from said modulated light.

* * * * *